(12) United States Patent
Makino et al.

(10) Patent No.: US 9,094,650 B2
(45) Date of Patent: Jul. 28, 2015

(54) CHAPTER CREATING DEVICE, CHAPTER CREATING METHOD, AND COMPUTER PROGRAM PRODUCT THEREFOR

(75) Inventors: Masaaki Makino, Yokohama (JP); Takeya Fujii, Yokohama (JP)

(73) Assignee: JVC KENWOOD CORPORATION, Yokohama-Shi (JP)

( * ) Notice: Subject to any disclaimer, the term of this patent is extended or adjusted under 35 U.S.C. 154(b) by 213 days.

(21) Appl. No.: 13/615,005

(22) Filed: Sep. 13, 2012

(65) Prior Publication Data

US 2013/0007619 A1    Jan. 3, 2013

Related U.S. Application Data

(63) Continuation of application No. PCT/JP2011/005665, filed on Oct. 7, 2011.

(30) Foreign Application Priority Data

| Nov. 24, 2010 | (JP) | ................................ | 2010-261776 |
| Nov. 24, 2010 | (JP) | ................................ | 2010-261777 |
| Nov. 24, 2010 | (JP) | ................................ | 2010-261778 |
| Sep. 28, 2011 | (JP) | ................................ | 2011-213494 |

(51) Int. Cl.
*H04N 5/76* (2006.01)
*G11B 27/034* (2006.01)
(Continued)

(52) U.S. Cl.
CPC ............... *H04N 5/76* (2013.01); *G11B 27/034* (2013.01); *G11B 27/105* (2013.01); *H04N 5/765* (2013.01);
(Continued)

G06F 2221/2151; G06F 3/0482; G11B 27/34; H04N 21/47
USPC .................................................. 715/716–723
See application file for complete search history.

(56) References Cited

U.S. PATENT DOCUMENTS

| 2001/0010523 | A1 | 8/2001 | Sezan et al. |
| 2003/0226145 | A1* | 12/2003 | Marsh ............................ 725/46 |

(Continued)

FOREIGN PATENT DOCUMENTS

| JP | 2006-157689 A | 6/2006 |
| JP | 2006-245907 A | 9/2006 |

(Continued)

OTHER PUBLICATIONS

Miyamori, "Automatic Indexing of Broadcast Content using its Live Chat on the Web," IEICE Technical Report, vol. 104, No. 670, Feb. 18, 2005, pp. 43 to 48.

(Continued)

*Primary Examiner* — Claudia Dragoescu
(74) *Attorney, Agent, or Firm* — Venable LLP; Michael A. Sartori; Todd R. Farnsworth

(57) ABSTRACT

A chapter creating device creates chapter data which indicates a reproduction point of content including at least one of screen image and sound and includes time information indicating a reproduction start position and a header indicating the outline of the content at the reproduction point. The chapter creating device includes: a live data receiving unit that receives live data including character string data which is input to a terminal; a chapter candidate selecting unit that displays the live data received by the live data receiving unit on a display unit so as to prompt a user to select the displayed live data using an input unit; and a chapter creating unit that creates the chapter data including the character string data of the selected live data as the header and the data registration date and time of the selected live data as the time information.

3 Claims, 44 Drawing Sheets

(51) Int. Cl.
  *H04N 5/765* (2006.01)
  *H04N 21/2187* (2011.01)
  *G11B 27/10* (2006.01)
  *H04N 21/4788* (2011.01)
  *H04N 21/84* (2011.01)
  *H04N 21/8543* (2011.01)
  *G06F 3/0482* (2013.01)
  *H04N 9/82* (2006.01)

(52) U.S. Cl.
  CPC ....... *H04N 21/2187* (2013.01); *H04N 21/4788* (2013.01); *H04N 21/84* (2013.01); *H04N 21/8543* (2013.01); *G06F 3/0482* (2013.01); *H04N 9/8205* (2013.01)

(56) References Cited

U.S. PATENT DOCUMENTS

| | | |
|---|---|---|
| 2007/0286584 A1 | 12/2007 | Yukimatsu |
| 2008/0140385 A1 | 6/2008 | Mahajan et al. |
| 2008/0285957 A1 | 11/2008 | Yoshimura et al. |
| 2009/0164904 A1 | 6/2009 | Horowitz et al. |
| 2010/0251295 A1* | 9/2010 | Amento et al. ............. 725/38 |
| 2010/0287475 A1* | 11/2010 | van Zwol et al. ........... 715/723 |

FOREIGN PATENT DOCUMENTS

| | | |
|---|---|---|
| JP | 2007-037031 A | 2/2007 |
| JP | 2008-312183 A | 12/2008 |
| WO | WO-00/72494 A2 | 11/2000 |

OTHER PUBLICATIONS

Ariyasu, "How to Generate Trackback between Text Comments and TV programs," FIT2007 Dai 6 Kai Forum on Information Technology Ippan Koen Ronbunshu, Separate vol. 1, Ippan Koen Ronbun, Model Algorithm Programming Software Hardware Architecture, Aug. 22, 2007, pp. 153-154.

Ariyasu, "An Intelligence Circulation System Based on Analyses of Viewer's Comments," IEICE Technical Report, vol. 108, No. 378, Jan. 8, 2009, pp. 5 to 9.

Extended European Search Report issued in European Patent Application No. 11843988.4 dated Apr. 16, 2015.

* cited by examiner

FIG.5

| CHAPTER ID | CHAPTER DATE AND TIME | HEADER CHARACTER STRING |
|---|---|---|
| chapter 1 | 2010-11-10 15:10:00 | I cannot stand the impudence of the cat |
| chapter 2 | 2010-11-10 15:30:00 | Isn't the hamburger here very delicious? |
| chapter 3 | 2010-11-10 15:45:00 | Cockroach is disgusting |
| ... | ... | ... |

FIG.9

| CONTENT ID | TITLE | ASSOCIATION START DATE AND TIME | REPRODUCTION TIME LENGTH |
|---|---|---|---|
| content ID1 | HyperNews | 2010-11-11 15:00:00 | 00:35:00 |
| content ID2 | Heartful Drama | 2010-11-11 18:00:00 | 01:30:00 |
| ... | ... | ... | ... |

FIG.14

| CHAPTER ID | CHAPTER DATE AND TIME | HEADER CHARACTER STRING | BROADCASTING STATION ID |
|---|---|---|---|
| chapter ID1 | 2010-11-10 15:10:00 | I cannot stand the impudence of the cat | broadcasting station 1 |
| chapter ID2 | 2010-11-10 15:30:00 | Isn't the hamburger here very delicious? | broadcasting station 1 |
| chapter ID3 | 2010-11-10 15:45:00 | Cockroach is disgusting | broadcasting station 2 |
| ... | ... | ... | ... |

FIG.15

| BROADCASTING STATION ID | BROADCASTING STATION NAME |
|---|---|
| broadcasting station 1 | Zyx television |
| broadcasting station 2 | Alps television |
| broadcasting station 3 | Super-radio |
| ⋮ | ⋮ |

FIG.16

| BROADCASTING STATION ID | BROADCASTING TIME | TITLE | ACTOR |
|---|---|---|---|
| broadcasting station 1 | 2010-11-11 15:00:00 TO 15:35:00 | HyperNews | 日本太郎 |
| | 2010-11-11 15:35:00 TO 16:00:00 | Shopping Information | 東京花子 |
| | ... | ... | ... |
| broadcasting station 2 | 2010-11-11 15:00:00 TO 16:00:00 | Measures against noxious insect at our home | 北海次郎 |
| ... | ... | ... | ... |

FIG.20

| CONTENT ID | TITLE | ASSOCIATION START DATE AND TIME | REPRODUCTION TIME LENGTH | BROADCASTING STATION ID |
|---|---|---|---|---|
| content ID1 | HyperNews | 2010-11-11 15:00:00 | 00:35:00 | broadcasting station 1 |
| content ID2 | Heartful Drama | 2010-11-11 18:00:00 | 01:30:00 | broadcasting station 2 |
| ... | ... | ... | ... | ... |

FIG.26

| CHAPTER ID | CHAPTER DATE AND TIME | CONTENT ID | HEADER CHARACTER STRING |
|---|---|---|---|
| chapter ID1 | 2010-11-10 15:10:00 | content ID1 | I cannot stand the impudence of the cat |
| chapter ID2 | 2010-11-10 15:30:00 | content ID1 | Isn't the hamburger here very delicious? |
| chapter ID3 | 2010-11-10 15:45:00 | content ID2 | Cockroach is disgusting |
| ... | ... | ... | ... |

FIG.27

| CONTENT ID | TITLE | ASSOCIATION START DATE AND TIME | REPRODUCTION TIME LENGTH |
|---|---|---|---|
| content ID1 | HyperNews | 2010-11-11 15:00:00 | 00:35:00 |
| content ID2 | Heartful Drama | 2010-11-11 18:00:00 | 01:30:00 |
| ... | ... | ... | ... |

| CONTENT ID | TITLE | ACTOR |
|---|---|---|
| content ID1 | HyperNews | 日本太郎 |
| content ID2 | Heartful Drama | 東京花子 |
| ⋮ | ⋮ | ⋮ |

FIG.41

| CHAPTER ID | CHAPTER DATE AND TIME | CONTENT ID | HEADER CHARACTER STRING |
|---|---|---|---|
| chapter ID1 | 2010-11-10 15:10:00 | content ID1 | I cannot stand the impudence of the cat |
| chapter ID2 | 2010-11-10 15:30:00 | content ID1 | Isn't the hamburger here very delicious? |
| chapter ID3 | 2010-11-10 15:45:00 | content ID2 | Cockroach is disgusting |
| ... | ... | ... | ... |

FIG.42

| CONTENT ID | ASSOCIATION START DATE AND TIME | REPRODUCTION TIME LENGTH |
|---|---|---|
| content ID1 | 2010-11-11 15:00:00 | 00:35:00 |
| content ID2 | 2010-11-11 18:00:00 | 01:30:00 |
| ⋮ | ⋮ | ⋮ |

FIG.43

| CONTENT ID | TITLE | ACTOR |
|---|---|---|
| content ID1 | HyperNews | NipponTaro |
| content ID2 | Shopping Information | TokyoHanako |
| ⋮ | ⋮ | ⋮ |

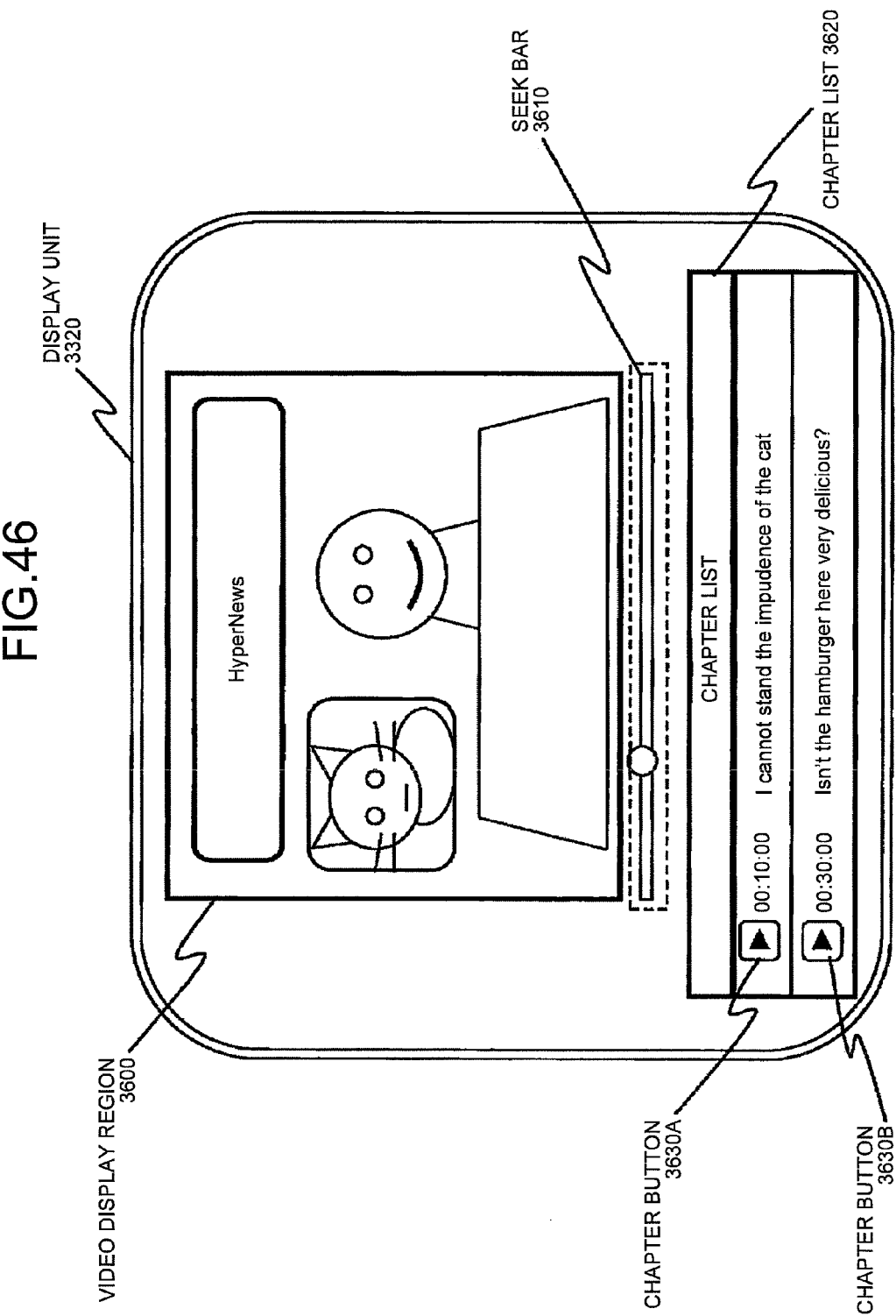

CHAPTER CREATING DEVICE, CHAPTER CREATING METHOD, AND COMPUTER PROGRAM PRODUCT THEREFOR

CROSS-REFERENCE TO RELATED APPLICATION(S)

This application is a continuation of International Application No. PCT/JP2011/005665, filed on Oct. 7, 2011 which claims the benefit of priority of the prior Japanese Patent Application No. 2010-261776, filed on Nov. 24, 2010, Japanese Patent Application No. 2010-261777, filed on Nov. 24, 2010, Japanese Patent Application No. 2010-261778, filed on Nov. 24, 2010 and Japanese Patent Application No. 2011-213494, filed on Sep. 28, 2011, the entire contents of which are incorporated herein by reference.

BACKGROUND OF THE INVENTION

1. Field of the Invention

The present invention relates to a chapter creating device, a chapter creating method, and a computer program product for creating a chapter which separates scenes or situations of screen image.

2. Description of the Related Art

In recent year, for example, screen image or music has been commonly stored as digital data in a digital storage, such as an HDD (Hard Disk Drive) or an SSD (Solid State Drive), or an optical disc, such as a DVD (Digital Versatile Disc) or a BD (Blu-ray Disc).

In the above described digitalized data, not only digital content, which is a main body of the screen image or music, but also information attached to the digital content can be recorded at the same time. As an example of the information attached to the digital content, there is information called a "chapter" for separating the scenes or situations of screen image. The chapter information is combined with the digital content and is recorded. In this way, when reproducing the digital content, the user can reproduce the screen image from the position of the chapter by only selecting the chapter.

A header for explaining association with the scene of the screen image can be given to the chapter. In general, an appropriate header is given to a packaged DVD or BD by a manufacturer. In the case of screen image content recorded by the individual user, the user needs to edit header information. However, in order to give the header to the chapter, the user needs to perform a complicated operation of inputting characters.

Japanese Laid-open Patent Publication No. 2006-245907 discloses a technique which displays a list of captions attached to screen image and cues a desired scene when the user selects a caption corresponding to the desired scene. When this technique is used, the user can skip to a desired scene without performing a complicated operation of inputting characters since the caption serves as the header of the scene.

However, when the caption is used as described above, this technique is not applicable to the content which has no caption in the first place.

Even if the content includes the captions, since the caption information mainly includes character data of the remarks by the performer, it is difficult to skip to a scene which is not expressed as a caption such as the expression or action of the performer.

A method which gives an appropriate header to the chapter without using a caption is not disclosed except for a method in which the user directly inputs the header.

SUMMARY OF THE INVENTION

The present invention has been made in view of the above-mentioned problems and to provide a technique which enables the user to appropriately create the header of a chapter without inputting characters. To solve the above described problems, according to an aspect of the present invention, a chapter creating device creates chapter data which indicates a reproduction point of content including at least one of screen image and sound and includes time information indicating a reproduction start position and a header indicating the outline of the content at the reproduction point. The chapter creating device includes: a live data receiving unit that receives live data including character string data which is input to a terminal by a person who views and/or listens to the content and is transmitted from the terminal and a data registration date and time which is a date and time when the character string data is transmitted; a chapter candidate selecting unit that displays the live data received by the live data receiving unit on a display unit so as to prompt a user to select the displayed live data using an input unit; and a chapter creating unit that creates the chapter data employing the character string data of the selected live data as the header and the data registration date and time of the selected live data as the time information.

The chapter data is data for separating broadcast content and may include time information indicating a separation position, a header indicating the outline of the content at the time specified by the time information, and a broadcasting station ID configured to identify a broadcasting station which broadcasts the broadcast content. The chapter creating device may further include: a broadcast content information storage unit that stores a combination of the broadcasting time of the broadcast content which is broadcasted by the broadcasting station and broadcast content information, which is sub-information about the broadcast content; and a broadcasting station identifying unit that allocates the broadcasting station ID to the live data on the basis of the character string data of the live data and the broadcast content information associated with a first broadcast content, which is the broadcast content in which the data registration date and time of the live data is included in the broadcasting time. The chapter creating unit may create the chapter data using the character string data of the live data selected by the chapter candidate selecting unit as the header, the data registration date and time of the selected live data as the time information, and the broadcasting station ID allocated to the selected live data.

Another aspect of the present invention still relates to a chapter creating device. The chapter creating device creates chapter data which indicates a reproduction point of content including at least one of screen image and sound and includes a content ID indicating an identifier of the content, time information indicating a reproduction start position, and a header indicating the outline of the content at the reproduction point. The chapter creating device includes: a content storage unit that stores the content ID, a recording start time, which is a time when the recording of the content starts, and the recording time of the content; a content selecting unit that causes a user to select the content; a live data receiving unit that receives live data including character string data which is input to a terminal by a person who views and/or listens to the content and is transmitted from the terminal and a data registration date and time which is a date and time when the character string data is transmitted, the live data having the data registration date and time included in a period specified by the recording start time and the recording time of the selected content; a chapter candidate selecting unit that displays the live data received by the live data receiving unit on a display unit so as to prompt the user to select the displayed live data using an input unit; and a chapter creating unit that combines the character string data of the selected live data as the header, the data registration date and time of the selected live data as the time information, and the content ID of the selected content to create the chapter data.

The chapter creating device may further include: a content information storage unit that stores a combination of content information, which is bibliographic information of the content, and the content ID of the content; and a live data pruning unit that calculates the degree of association between the character information of the live data acquired by the live data receiving unit and the content information corresponding to the selected content and deletes the live data with the degree of association less than a predetermined threshold value.

Another aspect of the present invention relates to a chapter creating method. The chapter creating method relates to creating chapter data which indicates a reproduction point of content including at least one of screen image and sound and includes time information indicating a reproduction start position and a header indicating the outline of the content at the reproduction point. The chapter creating method includes: receiving live data including character string data which is input to a terminal by a person who views and/or listens to the content and is transmitted from the terminal and a data registration date and time which is a date and time when the character string data is transmitted; displaying the received live data on a display unit so as to prompt a user to select the displayed live data using an input unit; and creating the chapter data including the character string data of the selected live data as the header and the data registration date and time of the selected live data as the time information.

Another aspect of the present invention still relates to a chapter creating method. The chapter creating method relates to creating chapter data which indicates a reproduction point of content including at least one of screen image and sound and includes a content ID indicating an identifier of the content, time information indicating a reproduction start position, and a header indicating the outline of the content at the reproduction point. The chapter creating method includes: prompting a user to select a content from the stored contents; receiving live data including character string data which is input to a terminal by a person who views and/or listens to the content and is transmitted from the terminal and a data registration date and time which is a date and time when the character string data is transmitted, the live data having the data registration date and time included in a period specified by the recording start time and the recording time of the selected content; displaying the received live data on a display unit so as to prompt the user to select the displayed live data using an input unit; and combining the character string data of the selected live data as the header, the data registration date and time of the selected live data as the time information, and the content ID of the selected content to create the chapter data.

Another aspect of the present invention relates to a computer program product that has a non-transitory computer readable medium including programmed instructions for creating chapter data. When executed by a computer, the instructions cause the computer to perform: receiving live data including character string data which is input to a terminal by a person who views and/or listens to content and is transmitted from the terminal and a data registration date and time which is a date and time when the character string data is transmitted; displaying the received live data on a display unit so as to prompt a user to select the displayed live data using an input unit; and creating the chapter data indicating a reproduction point of the content including at least one of screen image and sound and including time information indicating a reproduction start position and a header indicating the outline of the content at the reproduction point by employing the character string data of the selected live data as the header and by employing the data registration date and time of the selected live data as the time information.

Another aspect of the present invention still relates to a computer program product that has a non-transitory computer readable medium including programmed instructions for creating chapter data. When executed by a computer, the instructions cause the computer to perform: prompting a user to select a content from the stored contents; receiving live data including character string data which is input to a terminal by a person who views and/or listens to the content and is transmitted from the terminal and a data registration date and time which is a date and time when the character string data is transmitted, for which the live data has the data registration date and time included in a period specified by a recording start time and a recording time of the selected content; displaying the received live data on a display unit so as to prompt the user to select the displayed live data using an input unit; and creating the chapter data indicating a reproduction point of the content including at least one of screen image and sound and including a content ID indicating an identifier of the content, time information indicating a reproduction start position, and a header indicating the outline of the content at the reproduction point by combining the character string data of the selected live data as the header, the data registration date and time of the selected live data as the time information, and the content ID of the selected content.

An arbitrary combination of the above constituents and any interchanging of methods, devices, systems, recording media, computer program products, and the like that depict an aspect of the present invention are also usable.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of a chapter storage unit according to the first embodiment of the present invention;

FIG. 9 is a diagram illustrating an example of a content storage unit according to the first embodiment of the present invention;

FIG. 14 is a diagram illustrating an example of a chapter storage unit according to the second embodiment of the present invention;

FIG. 15 is a diagram illustrating an example of a broadcasting station information storage unit according to the second embodiment of the present invention;

FIG. 16 is a diagram illustrating an example of a broadcast content information storage unit according to the second embodiment of the present invention;

FIG. 20 is a diagram illustrating an example of a content storage unit according to the second embodiment of the present invention;

FIG. 26 is a diagram illustrating an example of the format of a chapter storage unit according to the third embodiment of the present invention;

FIG. 27 is a diagram illustrating an example of the format of a content storage unit according to the third embodiment of the present invention;

FIG. 41 is a diagram illustrating an example of the format of a chapter storage unit according to the fifth embodiment of the present invention;

FIG. 42 is a diagram illustrating an example of the format of a content storage unit according to the fifth embodiment of the present invention;

FIG. 43 is a diagram illustrating an example of the format of a content information storage unit according to the fifth embodiment of the present invention;

FIG. 46 is a diagram illustrating an example of a user interface presented by a content reproducing unit according to the fifth embodiment of the present invention.

DESCRIPTION OF EMBODIMENTS

Detailed Description of the Preferred Embodiments

Hereinafter, some embodiments of the present invention will be described as follows.

First Embodiment

Figure 1:
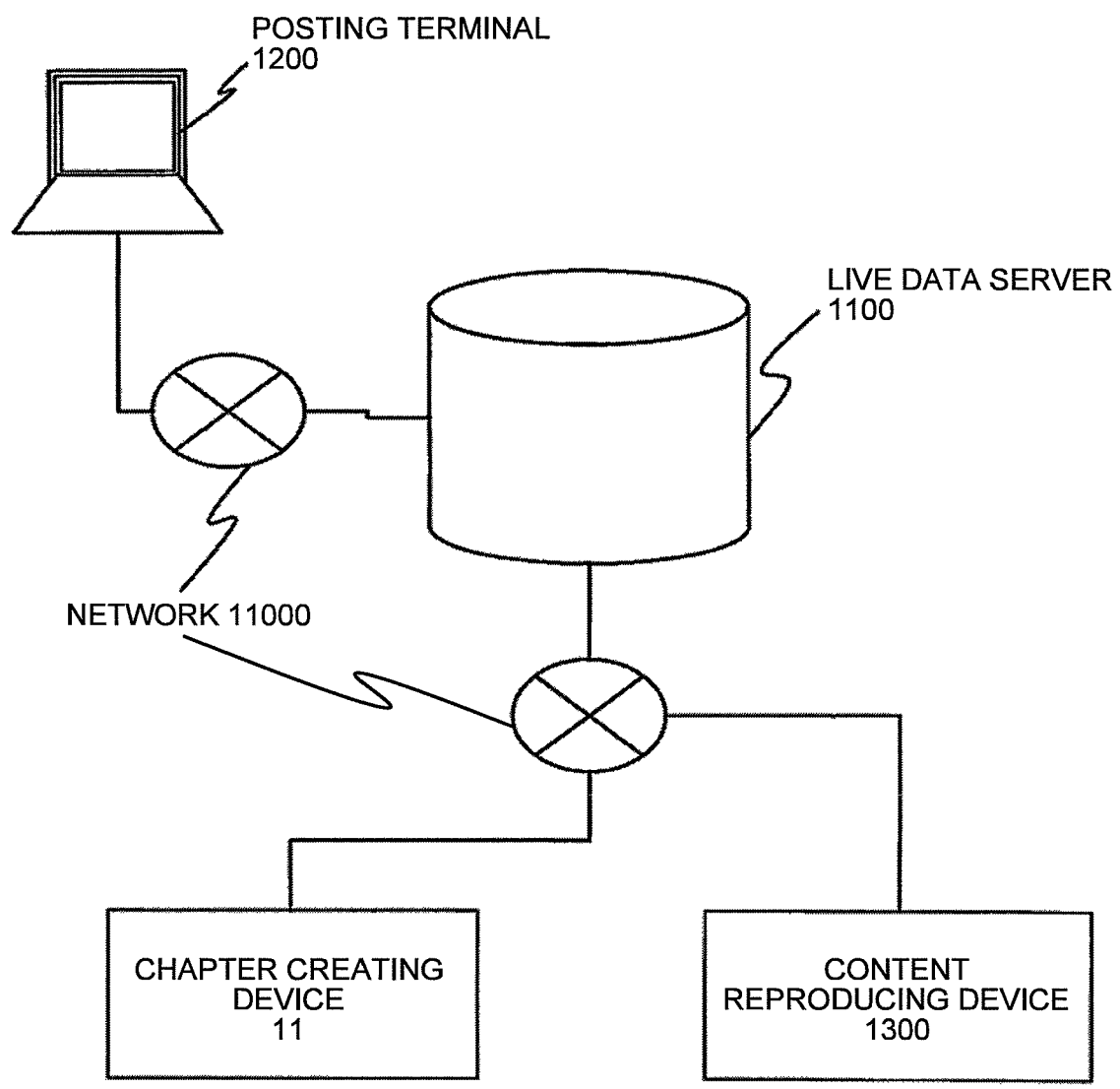
FIG. 1 is a system configuration diagram illustrating a first embodiment of the present invention.

FIG. 1 is a diagram illustrating the entire system according to a first embodiment of the present invention, in which a chapter creating device 11, a content reproducing device 1300, and a live data server 1100 are connected to each other through a network 11000 and the live data server 1100 is connected to a posting terminal 1200 through the network 11000.

The live data server 1100 is a server for accumulating data transmitted from the user who uses a service and for opening the data to other users. The data is represented by what is called an SNS (Social Networking Service), BBS (Bulletin Board System), or a blog (including a miniblog). The data accumulated in the live data server includes character information indicating the feeling of the user at the time when the data is being created. The live data server 1100 according to the first embodiment stores the character information transmitted by the posting terminal 1200 so as to be combined with the date and time when the character information is received. In addition, a plurality of live data servers 1100 may be provided.

Figure 2:
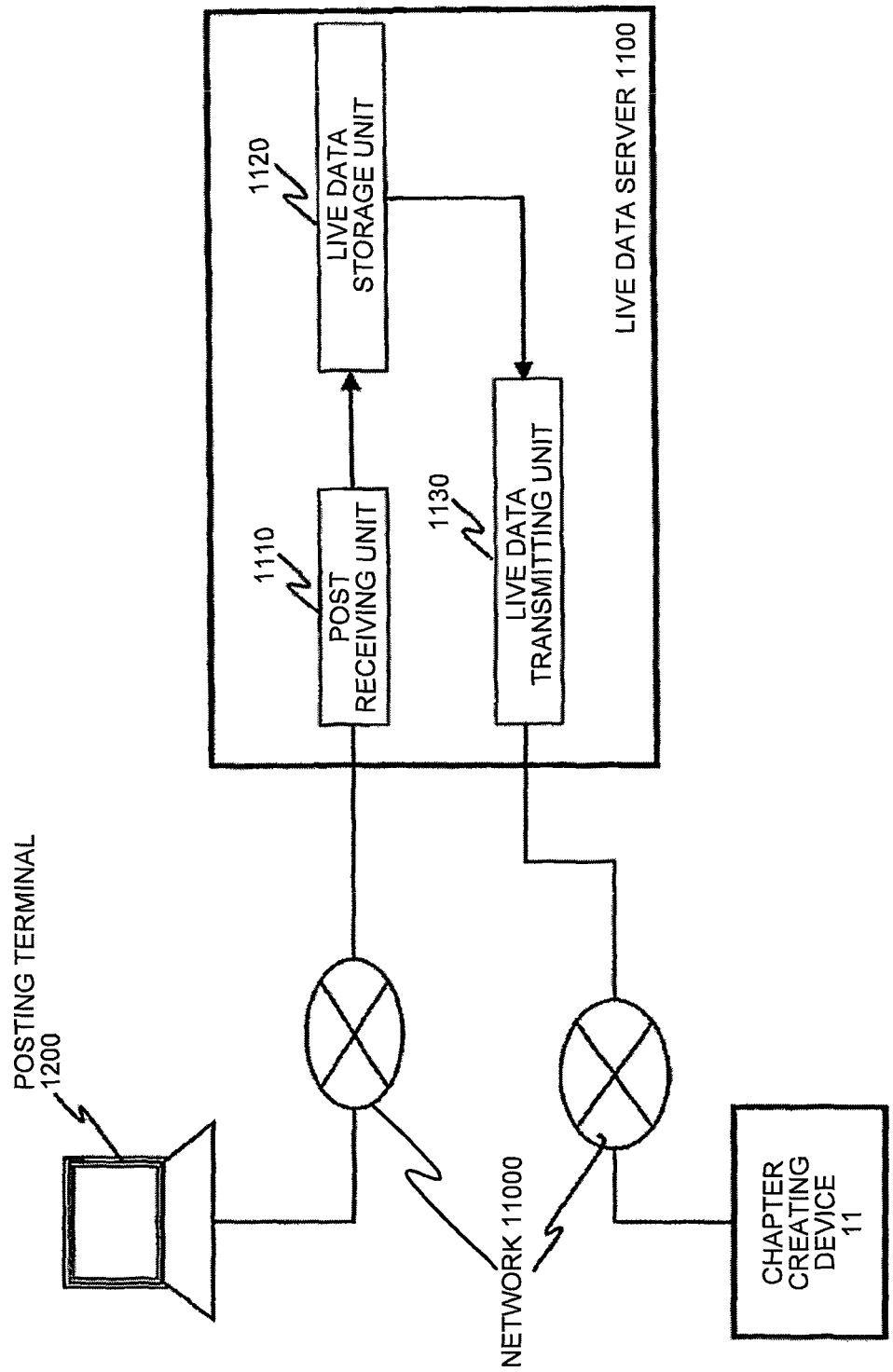
FIG. 2 is a block diagram illustrating the structure of a live data server according to the first embodiment of the present invention.

FIG. 2 is a block diagram illustrating the structure of the live data server 1100. The live data server 1100 includes a post receiving unit 1110, a live data storage unit 1120, and a live data transmitting unit 1130.

The post receiving unit 1110 receives the character information transmitted from an external posting terminal 1200 via the network 11000 and stores the character information together with the posting date and time, which is the date and time when the character information is received, in the live data storage unit 1120. Hereinafter, data obtained by combining the character information with the posting date and time of the character information is referred to as live data.

The live data storage unit 1120 is a database which stores the live data.

A live data transmitting unit 1130 transmits the live data stored in the live data storage unit 1120 through the network 11000. In addition, when the chapter creating device 11 designates the search conditions of the live data, such as the range of the posting date and time or a character string included in the character information, the live data transmitting unit 1130 transmits only the live data satisfying the search conditions to the chapter creating device 11.

The above is the description of the live data server 1100. The number of live data servers 1100 is not limited to one, but may be two or more.

The posting terminal 1200 includes an input interface and a display for editing the character information for a general PC or a portable information terminal and has a communication section for transmitting the character information to the live data server 1100. A plurality of posting terminals 1200 may be provided. The number of users of the posting terminals 1200 may be one or more.

Next, the chapter creating device 11 will be described.

Figure 3:
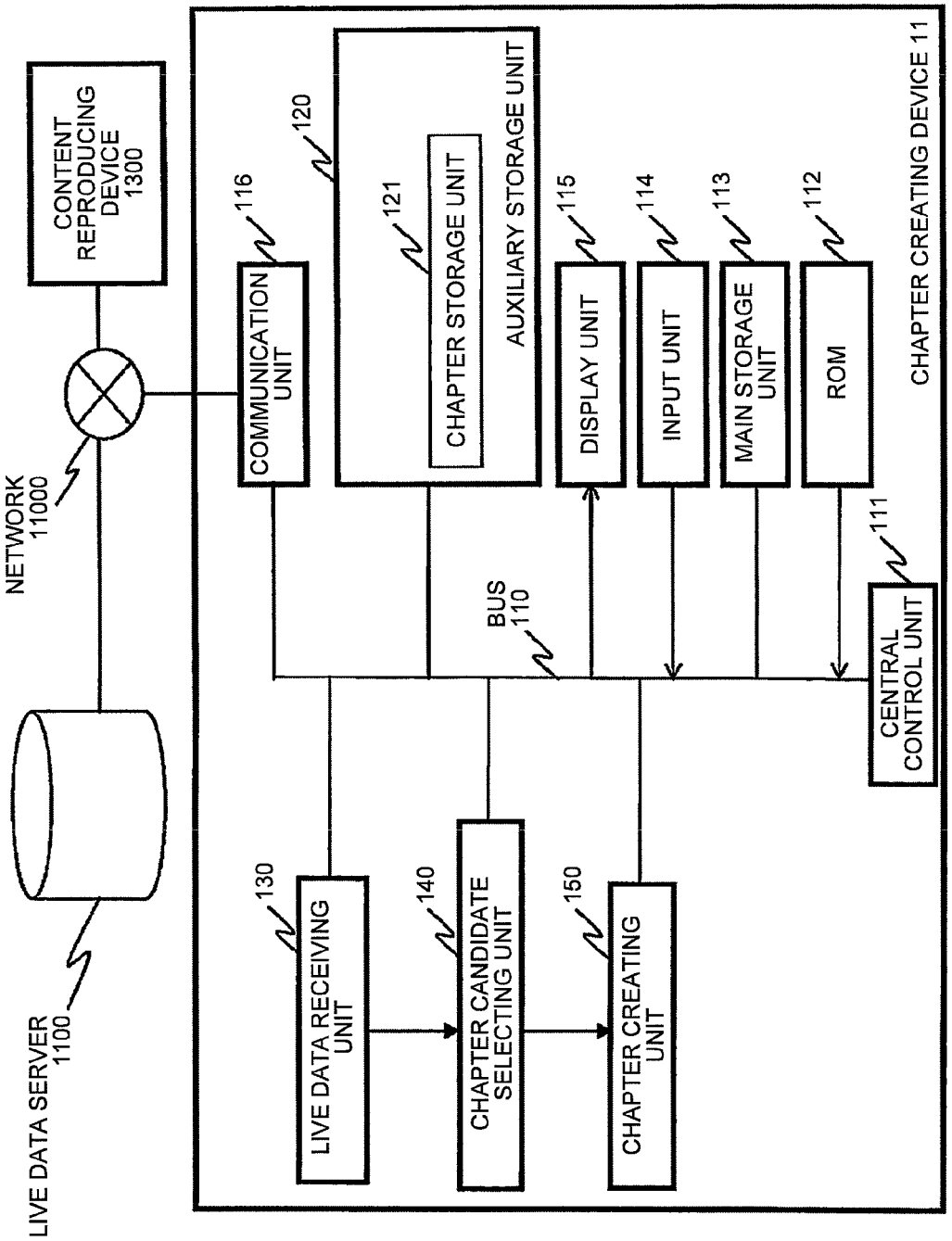
FIG. 3 is a block diagram illustrating the structure of a chapter creating device according to the first embodiment of the present invention.

FIG. 3 is a block diagram illustrating the preferred structure of the chapter creating device 11 according to the first embodiment. The chapter creating device 11 includes a central control unit 111, ROM 112, a main storage unit 113, an input unit 114, a display unit 115, a communication unit 116, an auxiliary storage unit 120, a live data receiving unit 130, a chapter candidate selecting unit 140, and a chapter creating unit 150 which are connected to each other through a bus 110. The communication unit 116 is connected to the live data server 1100 and a content reproducing device 1300, which are external devices, through the network 11000. In FIG. 3, the chapter creating device 11 is illustrated as a hardware component using a functional block diagram. However, the entire chapter creating device 11 may be one software program and may be softwarily implemented on a PC including a memory or a CPU.

Figure 4:
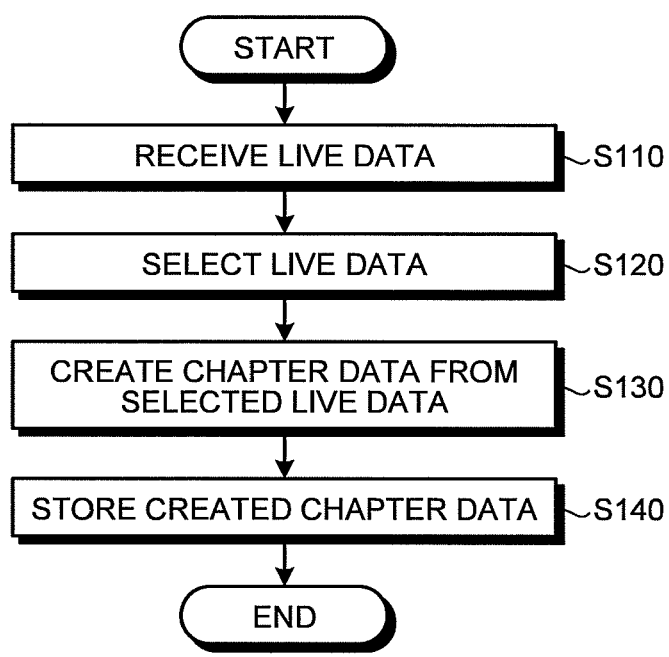
FIG. 4 is a flowchart illustrating the flow of the process of the chapter creating device according to the first embodiment of the present invention.

Next, the flow of a chapter creating process of the chapter creating device 11 will be described with reference to the flowchart illustrated in FIG. 4.

First, the live data receiving unit 130 receives the live data from the live data server 1100 through the network 11000 (Step S110).

Then, the chapter candidate selecting unit 140 selects live data, which is original data for creating a chapter, from the live data items received by the live data receiving unit 130 (Step S120).

Then, the chapter creating unit 150 creates a chapter from the live data selected by the chapter candidate selecting unit 140 (Step S130).

Then, the chapter creating unit 150 stores the created chapter in a chapter storage unit 121 (Step S140).

The above is the flow of the chapter creating process by the chapter creating device 11.

Next, each unit of the chapter creating device 11 will be described in detail. The central control unit 111 controls the overall operation of the chapter creating device 11 and includes a CPU (Central Processing Unit) or a PLD (Programmable Logic Device). The ROM 112 is read only memory and stores a basic control program for controlling the overall operation of the chapter creating device 11. The main storage unit 113 is a work area which is used by the central control unit 111 to execute a program and includes RAM or the like. The input unit 114 includes a keyboard, a mouse, a touch panel, and the like and receives an input from the user. The display unit 115 includes a CRT or a liquid crystal display and the like and displays information to the user. The communication unit 116 is, for example, a network card and communicates with an external network.

The auxiliary storage unit 120 is a high-capacity storage medium, such as an HDD (Hard Disk Drive) or an SSD (Solid State Drive), and includes a chapter storage unit 121.

The chapter storage unit 121 stores chapter data, which is a combination of a chapter date and time indicating the date and time of the chapter and a header character string. Basically, date and time data based on UTC (Universal Time, Coordinated) is stored as the chapter date and time. However, the chapter date and time is not limited to the date and time data based on UTC, but any date and time data may be stored as long as it can be converted into UTC. For example, data indicating JST (Japan Standard Time) may be used, or numerical data indicating Unix (registered trademark) time, which is relative time beginning with Jan. 1, 1970 00:00:00 UTC, may be used.

FIG. 5 is a diagram illustrating an example of the format of the chapter storage unit 121, in which the chapter date and time and a header character string which are chapter data are stored. In FIG. 5, a chapter ID, which is an identifier for identifying each chapter data item, is stored so as to be combined with each chapter data item. For example, the chapter date and time of chapter data with a chapter ID "chapter 1" is "2010-11-10 15:10:00" and a header character string is "I cannot stand the impudence of the cat".

The live data receiving unit 130 receives the live data from the live data server 1100 which is connected to the live data receiving unit 130 via the network 11000 by the communication unit 116. The search conditions of the live data server 1100 are designated to transmit the live data of the range from the previous communication date and time when communication between the live data receiving unit 130 and the live data server 1100 is performed to the current time. Specifically, in the case the previous communication date and time is 2010-11-10 20:00:00 and the current time is 2010-11-11 1:30:00, the search conditions are designated such that the live data in the range from 2010-11-10 20:00:00 to 2010-11-11 1:30:00 is transmitted and the live data server 1100 is requested to transmit the live data.

However, when communication between the live data receiving unit 130 and the live data server 1100 is performed for the first time, the search conditions are basically set such that the live data of between 24 hours ago and the current time is acquired since there is no previous communication date and time. However, the search conditions may be designated such that the live data earlier than 24 hours ago may be acquired.

When there are a plurality of live data servers 1100, the designer of the chapter creating device 11 basically sets one of the live data servers 1100 from which live data will be received in advance. However, the live data may be received from all of the live data servers 1100.

The chapter candidate selecting unit 140 causes the user to select live data to be imported as a chapter out of the live data items received by the live data receiving unit 130. When prompting the user to perform a selection operation the chapter candidate selecting unit 140 presents a user interface for assisting the selection to the user.

Figure 6:
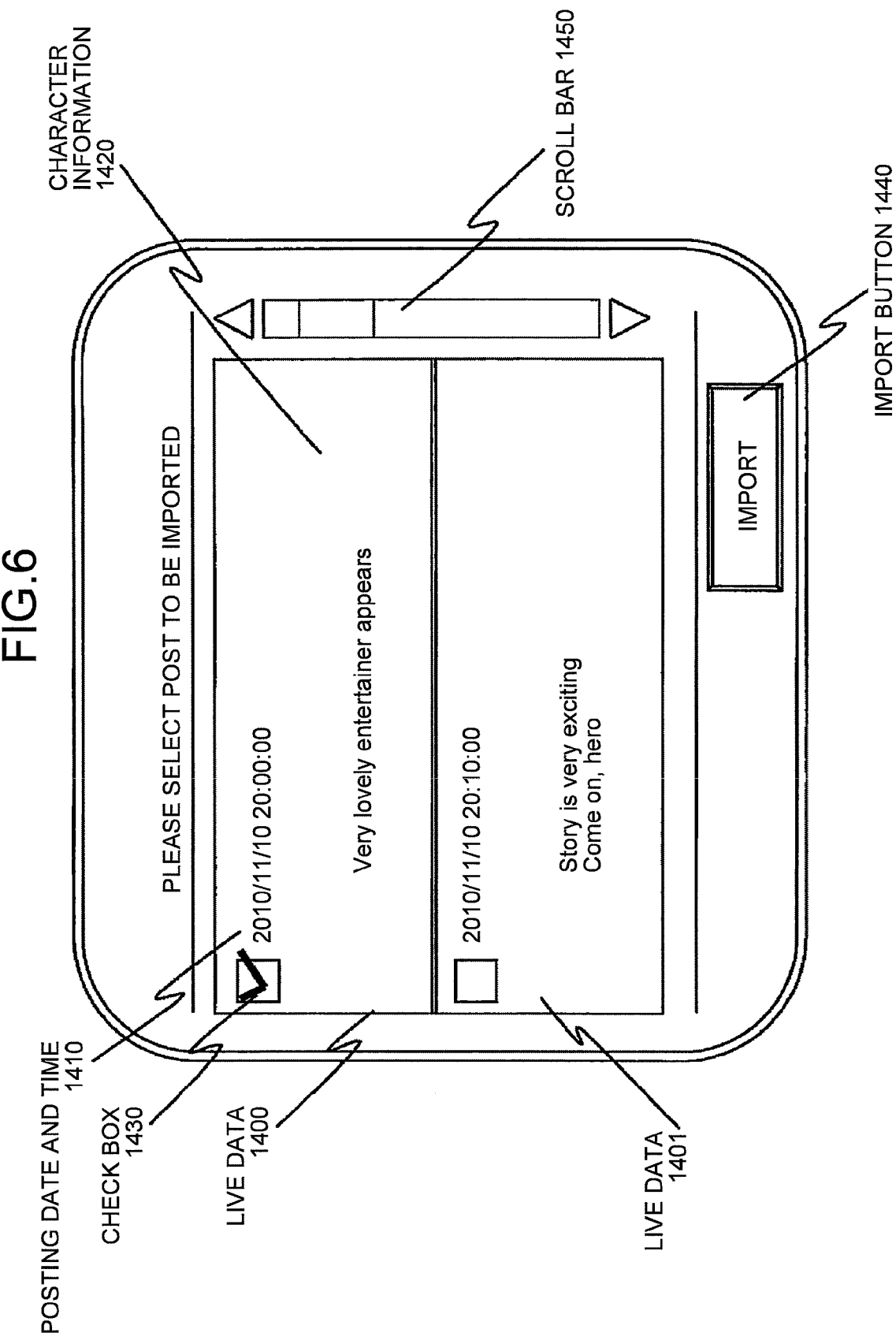
FIG. 6 is a diagram illustrating an example of a user interface presented by a chapter candidate selecting unit according to the first embodiment of the present invention.

FIG. 6 is a diagram illustrating the user interface for selecting the live data to be imported as a chapter, in which live data 1400 and live data 1401 are displayed on the display unit 115. In FIG. 6, other live data items may be displayed by operating a scroll bar 1450. A posting date and time 1410 indicates the date and time when the live data 1400 is posted indicating 2010-11-10 20:00:00. Character information 1420 is character information of the live data 1400 and indicates "A very lovely entertainer appears". A check box 1430 is a component of the user interface which sets whether or not to import the live data 1400 as a chapter. When the check box 1430 is checked, it indicates that the live data 1400 is imported as a chapter. The check state of the check box 1430 is changed by the user. In the example illustrated in FIG. 6, since the check box 1430 is checked, it indicates that the live data 1400 is imported as a chapter. The other live data items are constituted by the similar components as those of the live data 1400. That is, the posting date and time, the character information, and the check box of each live data item are arranged. When an import button 1440 illustrated in FIG. 6 is pressed down by the user, the chapter candidate selecting unit 140 acquires the selected live data, that is, the live data whose check box is checked and transmits the live data to the chapter creating unit 150.

The chapter creating unit 150 creates a chapter from the live data selected by the chapter candidate selecting unit 140 and stores the chapter in the chapter storage unit 121. Specifically, the chapter data is created using the posting date and time of the live data as the chapter date and time and the character information of the live data as a chapter header. At that time, the chapter may be edited such that the length of characters in the chapter header is equal to or less than a predetermined value, for example, 20 characters. In addition, the chapter creating unit 150 stores the created chapter data in the chapter storage unit 121.

The above is the description of the chapter creating device 11. According to the above-mentioned chapter creating device 11, all the user needs to do is putting a check mark in interesting live data by viewing the character information. Therefore, it is possible to create a chapter without performing a complicated operation, such as the input of characters, and set a chapter header indicating the outline of the chapter.

Next, the content reproducing device 1300 will be described. The content reproducing device 1300 reproduces digital content, such as screen image data or audio data, and acquires the chapter included in the range of the recording date and time of the digital content from the chapter storage unit 121 of the chapter creating device 11 such that the user can designate a scene to be reproduced.

Figure 7:
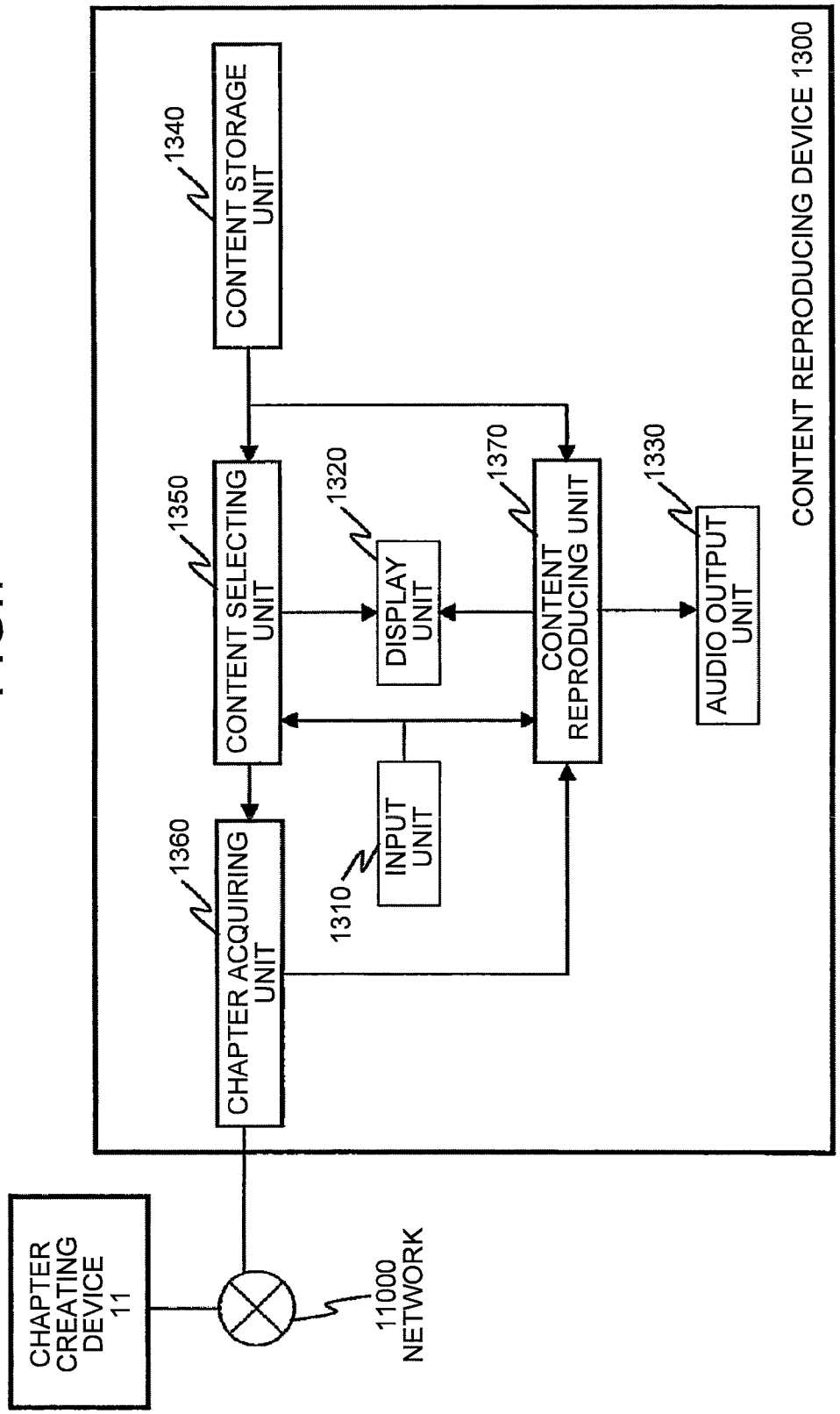
FIG. 7 is a block diagram illustrating the structure of a content reproducing device according to the first embodiment of the present invention.

FIG. 7 is a block diagram illustrating the content reproducing device 1300. The content reproducing device 1300 includes an input unit 1310, a display unit 1320, an audio output unit 1330, a content storage unit 1340, a content selecting unit 1350, a chapter acquiring unit 1360, and a content reproducing unit 1370.

Figure 8:
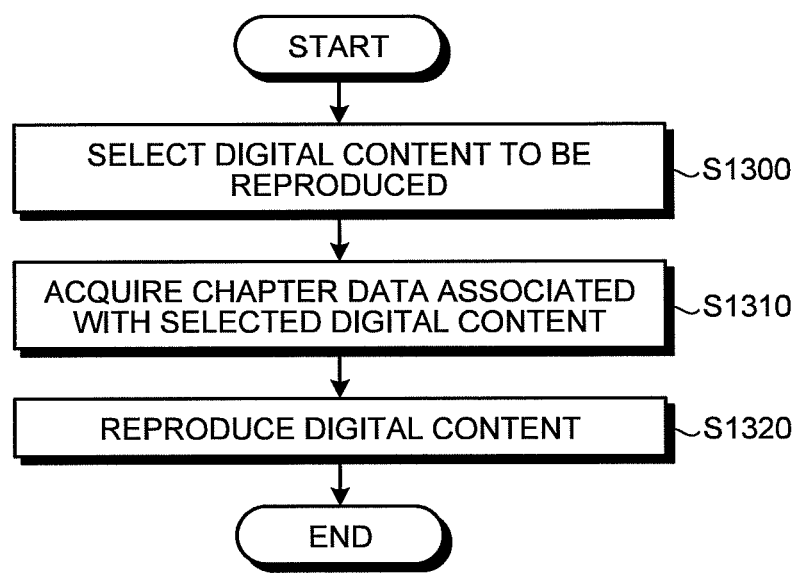
FIG. 8 is a flowchart illustrating the flow of the process of the content reproducing device according to the first embodiment of the present invention.

The flow of a digital content reproducing process performed by the content reproducing device 1300 will be described with reference to the flowchart illustrated in FIG. 8.

First, the content selecting unit 1350 directs the display unit 1320 to display a user interface screen and causes the user to select digital content to be reproduced via the input unit 1310 (Step S1300).

Then, the chapter acquiring unit 1360 acquires chapter data included in the range of the recording date and time of the digital content selected in Step S1300 from the chapter creating device 11 (Step S1310).

Then, the content reproducing unit 1370 starts reproducing the digital content selected in Step S1300, displaying the chapter received in Step S1310 on the display unit 1320, and presenting the user interface which can be input via the input unit 1310 (Step S1320).

The above is the flow of the process performed by the content reproducing device 1300.

Next, each unit of the content reproducing device 1300 will be described in detail. The input unit 1310 is a unit that receives an input from the user and includes a keyboard, a mouse, a touch panel, or the like. The display unit 1320 is a unit that displays information to the user and includes a CRT, a liquid crystal display, or the like. The audio output unit 1330 is a unit that converts a digital audio signal into an analog signal, amplifies the analog signal, and outputs the amplified signal to an external speaker, a headphone, or the like.

The content storage unit 1340 stores a combination of reproducible digital content, such as screen image data or audio data, an association start date and time, which is the start date and time of association with the digital content, the length of the reproduction time of the digital content, and the title of the digital content. For the association start date and time, when the digital content is broadcast content, the date and time when broadcasting of the content started is stored and, when the digital content is personal screen image content, the date and time when the recording of the content started is stored.

FIG. 9 is a diagram illustrating an example of the format of the content storage unit 1340 that stores combination of a content ID, the association start date and time, and a reproduction time length. The content ID is an identifier for identifying digital content; and the reproduction time length is the length of the content reproduction time. For example, the title of digital content with a content ID "content ID1" is "HyperNews", the association start date and time is "2010-11-11 15:00:00" and the reproduction time length is "00:35:00", that is, 35 minutes.

Figure 10:
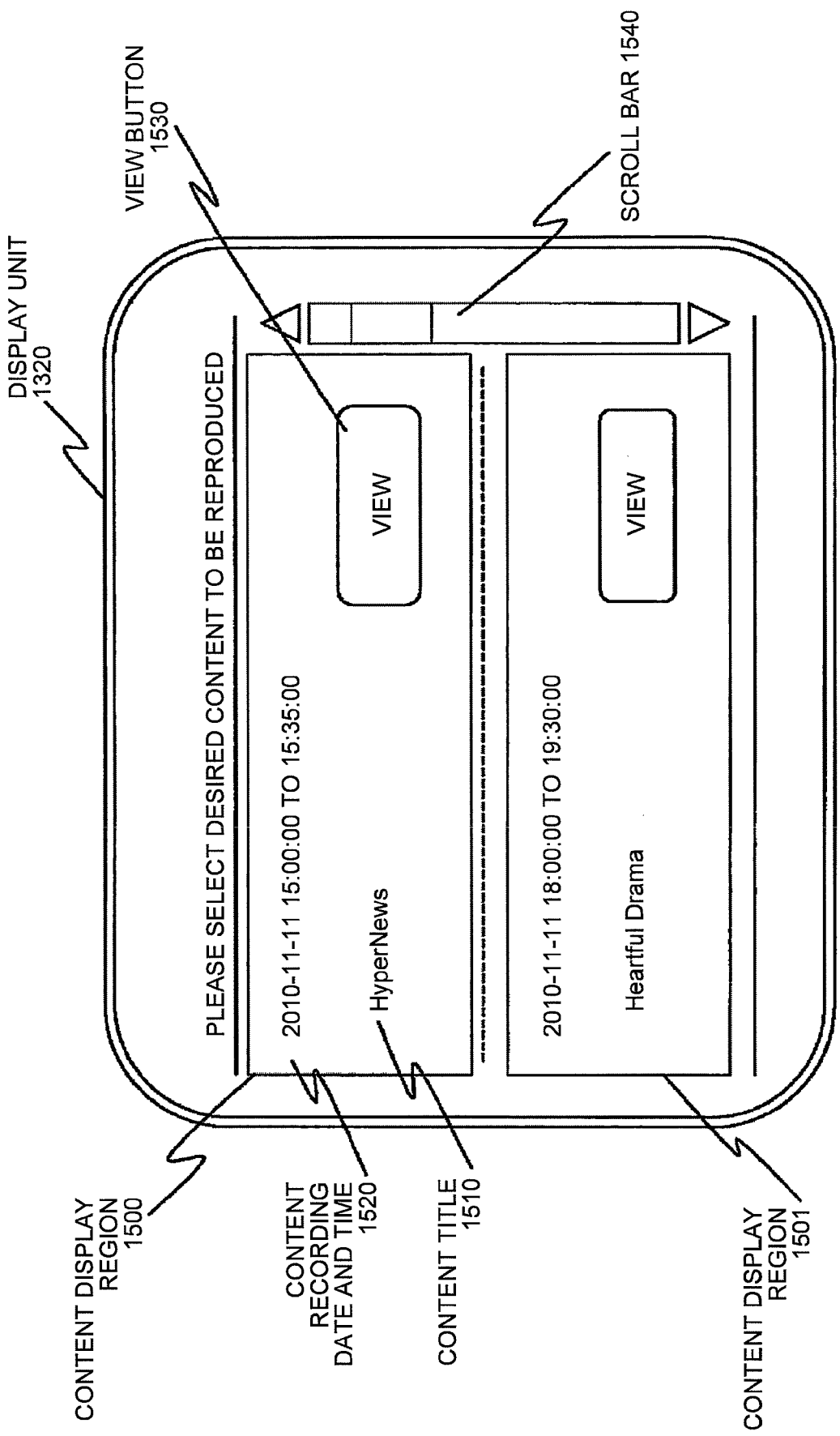
FIG. 10 is a diagram illustrating an example of a user interface presented by a content selecting unit according to the first embodiment of the present invention.

The content selecting unit 1350 causes the user to select the digital content to be reproduced via the input unit 1310. In order to help the user input information, the content selecting unit 1350 displays the user interface screen on the display unit 1320 to cause the user to select the digital content to be reproduced. FIG. 10 is a diagram illustrating an example of the user interface screen presented by the content selecting unit 1350.

In FIG. 10, information with the content ID "content ID1" illustrated in FIG. 9 is displayed in a content display region 1500 and information with a content ID "content ID2" illustrated in FIG. 9 is displayed in a content display region 1501.

Since the content display region 1500 and the content display region 1501 are constituted by the similar components, only the content display region 1500 will be described here. A content title 1510 in the content display region 1500 is a region in which the title of content is displayed and the title "HyperNews" with the content ID "content ID1" is displayed in the content title 1510. A content recording date and time 1520 in the content display region 1500 is a region in which the period from the date and time when the recording of content starts to the date and time when the recording of content ends is displayed, and "2010-11-11 15:00:00 to 15:35:00" is displayed in the content recording date and time 1520. A view button 1530 is a button that is pressed down by the user when the user starts viewing the content.

When a scroll bar 1540 is scrolled, the information in the content display region 1500 and the content display region 1501 is changed depending on the amount of scroll. The user operates the scroll bar 1540 to search for content and presses down the view button corresponding to content which is desired to be viewed, thereby starts viewing the content.

The chapter acquiring unit 1360 receives, from the chapter creating device 11, the chapter data included in the range from the association start date and time of the digital content selected by the content selecting unit 1350 to the reproduction time length of the content.

A detailed example in which the chapter data with the content ID "content ID1" illustrated in FIG. 9 is selected will be described. In this example, since the association start date and time of the chapter data with the content ID "content ID1" is 2010-11-11 15:00:00 and the reproduction time length is 35 minutes, chapter data in the range between 2010-11-11 15:00:00 and 2010-11-11 15:35:00 is received from the chapter creating device 11. In the case of the chapter data illustrated in FIG. 5, the chapters included in the above-mentioned time range are following two chapters: a chapter having the chapter ID "chapter ID1" and the chapter date and time 2010-11-11 15:10:00; and a chapter having the chapter ID "chapter ID2" and the chapter date and time 2010-11-11 15:30:00, thus above described two chapters are acquired.

The content reproducing unit 1370 starts the reproduction of the digital content selected by the content selecting unit 1350, outputs image of the digital content to the display unit 1320, and outputs an audio thereof to the audio output unit 1330. In addition, the content reproducing unit 1370 displays, on the display unit 1320, the user interface which enables the user to select the chapter acquired by the chapter acquiring unit 1360 via the input unit 1310. When the chapter is selected, the content reproducing unit 1370 moves the reproduction position of the digital content to a position where the selected chapter indicates. When the chapter date and time of the selected chapter is c and the association start date and time of the digital content is d, the reproduction position p of the digital content is calculated by the following Expression 1.

$$p = c - d \quad (1)$$

The reproduction position p calculated by Expression 1 is the time when the head of the digital content is 0.

Figure 11:
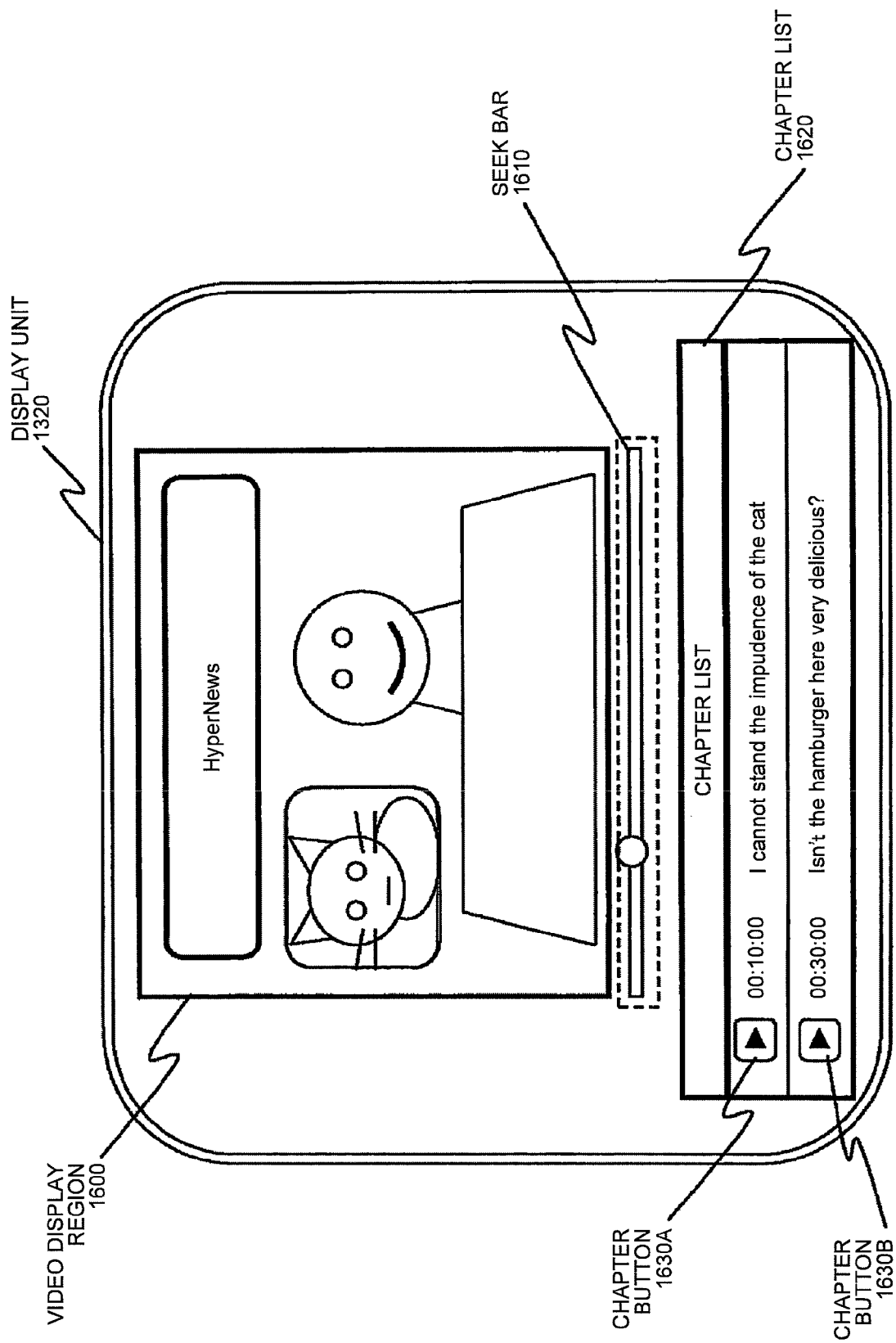
FIG. 11 is a diagram illustrating an example of a user interface presented by a content reproducing unit according to the first embodiment of the present invention.

FIG. 11 illustrates an example of the display of the user interface and the screen image data of content which are displayed on the display unit 1320 by the content reproducing unit 1370. In FIG. 11, a screen image display region 1600 is a region in which screen image of digital content to be reproduced is displayed. A seek bar 1610 is a controller which indicates information about the reproduction position of the digital content and enables the user to control the reproduction position. A chapter list 1620 displays chapters related to the digital content which is being reproduced. In FIG. 11, two chapters "I cannot stand the impudence of the cat" and "Isn't the hamburger here very delicious?" are displayed. A chapter button 1630A and a chapter button 1630B cause the reproduction position to move to each position of the chapter associated with the button as the user presses down the chapter button 1630A or a chapter button 1630B. For example, when the chapter button 1630A is pressed down, the reproduction position is moved to a position which is "00:10:00" from the head of the digital content, that is, a position which is 10 minutes from the head of the digital content. When the chapter button 1630B is pressed down, the reproduction position is moved to a position which is "00:30:00" from the head of the digital content, that is, a position which is 30 minutes from the head of the digital content.

As illustrated in FIG. 11, even when the user does not perform a character input operation, information indicating "I cannot stand the impudence of the cat" or "Isn't the hamburger here very delicious?" is displayed. In addition, it is guessed that an impudent cat appears before and after the chapter from the character information indicating "I cannot stand the impudence of the cat", and it is guessed that there is a dialogue about a delicious hamburger before and after the chapter from the character string "Isn't the hamburger here very delicious?".

The above is the description of the content reproducing device 1300.

As described above, the live data posted by the user who is the third party is used as a chapter. Therefore, the user can give a header which is easy to understand to the chapter, without performing character input operation at all.

In the first embodiment, the chapter creating device 11, the live data server 1100, and the content reproducing device 1300 are connected to each other through the network as separate apparatuses. However, they may be integrated to one, or arbitrary two of them may be arranged as the content reproducing device and the chapter creating device in one apparatus.

Second Embodiment

The system configuration of a second embodiment is similar to that of the first embodiment illustrated in FIG. 1 except for the structure of the chapter creating device 11 and the content reproducing device 1300. In the second embodiment, the chapter creating device 11 and the content reproducing device 1300 will be described as a chapter creating device 12 and a content reproducing device 1301, respectively.

The chapter creating device 12 according to the second embodiment calculates the degree of association of live data with a broadcasting station on the basis of the content of the character information of the live data and links the broadcasting stations with the high degree of association, in addition to the operation of the chapter creating device 11 according to the first embodiment. When chapter data is acquired from the chapter creating device 12, the content reproducing device 1301 according to the second embodiment acquires only chapter data with the same broadcasting station ID as that of the digital content to be reproduced such that a chapter which is not associated is not displayed.

Figure 12:
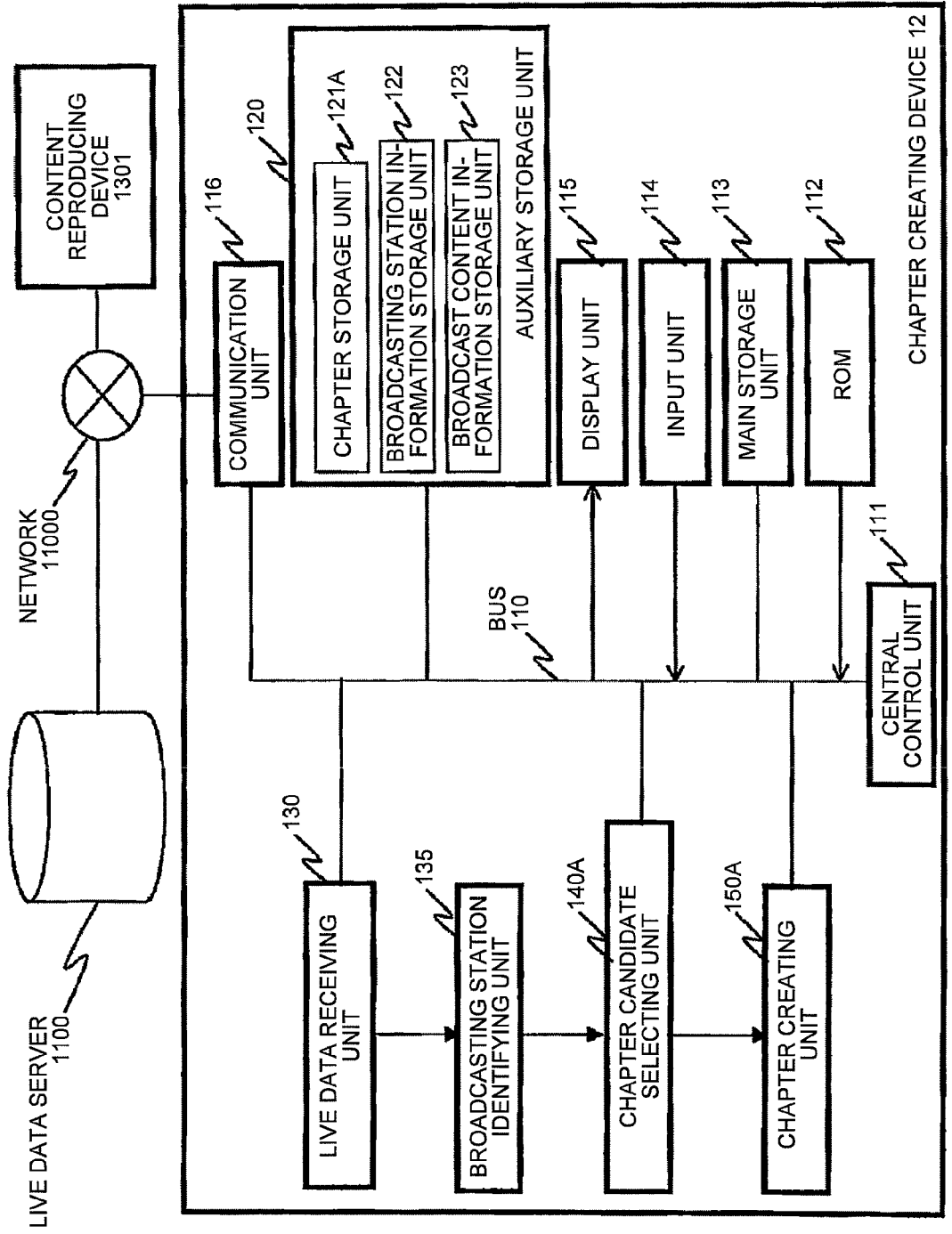
FIG. 12 is a block diagram illustrating the structure of a chapter creating device according to a second embodiment of the present invention.

FIG. 12 is a block diagram illustrating the structure of the chapter creating device 12 according to the second embodiment. The chapter creating device 12 differs from the chapter creating device 11 in that it includes new components, such as a broadcasting station information storage unit 122, a broadcast content information storage unit 123, and a broadcasting station identifying unit 135; and in that the structures are different from those of the chapter storage unit 121, the chapter candidate selecting unit 140, and the chapter creating unit 150. Therefore, in the chapter creating device 12, a chapter storage unit 121A, a chapter candidate selecting unit 140A, and a chapter creating unit 150A are used respectively. The broadcasting station information storage unit 122 and the broadcast content information storage unit 123 are provided in the auxiliary storage unit 120. The other structures are similar to those in the chapter creating device 11 and thus the description thereof will be omitted.

Figure 13:
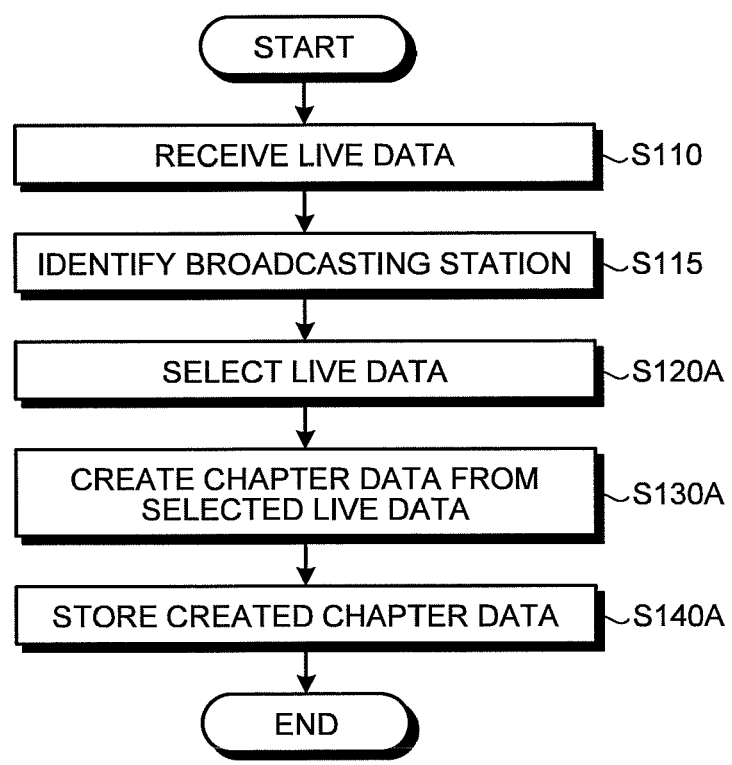
FIG. 13 is a flowchart illustrating the flow of the process of the chapter creating device according to the second embodiment of the present invention.

The flow of a chapter creating process by the chapter creating device 12 will be described with reference to the flowchart of FIG. 13.

First, a live data receiving unit 130 of the chapter creating device 12 receives live data from the live data server 1100 (Step S110). This process is similar to that in the chapter creating device 11.

Then, the broadcasting station identifying unit 135 of the chapter creating device 12 allocates a broadcasting station ID, which is an identifier for uniquely identifying a broadcasting station, to the received live data (Step S115).

Then, the chapter candidate selecting unit 140A of the chapter creating device 12 causes the user to select live data to be imported as a chapter (Step S120A). This process differs from Step S120 in the chapter creating device 11 illustrated in FIG. 4 in the user interface presented to the user.

Then, the chapter creating unit 150A of the chapter creating device 12 creates chapter data from the live data selected in Step S120A (Step S130A). This process differs from Step S130 in the chapter creating device 11 illustrated in FIG. 4 in the structural content of the chapter data.

Then, the chapter creating unit 150A of the chapter creating device 12 stores the chapter data created in Step S130A in the chapter storage unit 121A (Step S140A).

The above is the description of the flow of the chapter creating process by the chapter creating device 12.

Next, each unit of the chapter creating device 12 will be described in detail.

The chapter storage unit 121A stores the chapter date and time, the chapter header, and the broadcasting station ID. FIG. 14 is a diagram illustrating an example of the format of the chapter storage unit 121A, in which a combination of the chapter ID, the chapter date and time, the chapter header, and the broadcasting station ID is stored for one chapter data item. Among them, the chapter ID, the chapter date and time, and the chapter header are similar to those in the format of the chapter storage unit 121 illustrated in FIG. 5. The broadcasting station IDs of the broadcasting stations corresponding to chapter ID1 and chapter ID2 is "broadcasting station 1" and the broadcasting station ID of the broadcasting station corresponding to chapter ID3 is "broadcasting station 2". That is, the chapters with the chapter IDs "chapter ID1" and "chapter ID2" are of the same broadcasting station, and the chapter with the chapter ID "chapter ID3" is the chapter of the broadcasting station different from that for the chapter with the chapter ID "chapter ID1" or "chapter ID2".

The broadcasting station information storage unit 122 stores the broadcasting station ID for uniquely identifying the broadcasting station and a broadcasting station name. FIG. 15 is an example of the format of the broadcasting station information storage unit 122, in which a combination of the broadcasting station ID and the broadcasting station name is stored. For example, the name of the broadcasting station with a broadcasting station ID "broadcasting station 1" is "Zyx television", the name of the broadcasting station with a broadcasting station ID "broadcasting station 2" is "Alps television", and the name of the broadcasting station with a broadcasting station ID "broadcasting station 3" is "Superradio".

The broadcast content information storage unit 123 stores a combination of the broadcasting station ID, a broadcasting time, and broadcast content information, which is sub-information about broadcast content. The broadcast content information is data, such as a title, a genre, a performer, and a caption associated with the broadcast content. In addition, the broadcast content information storage unit 123 stores the combination such that the associated broadcast content information can be uniquely determined by the broadcasting station ID and the broadcasting time. In other words, this means that when any one of the broadcasting station ID and broadcasting time is different, the broadcast content information items to be stored are different.

Figure 17:
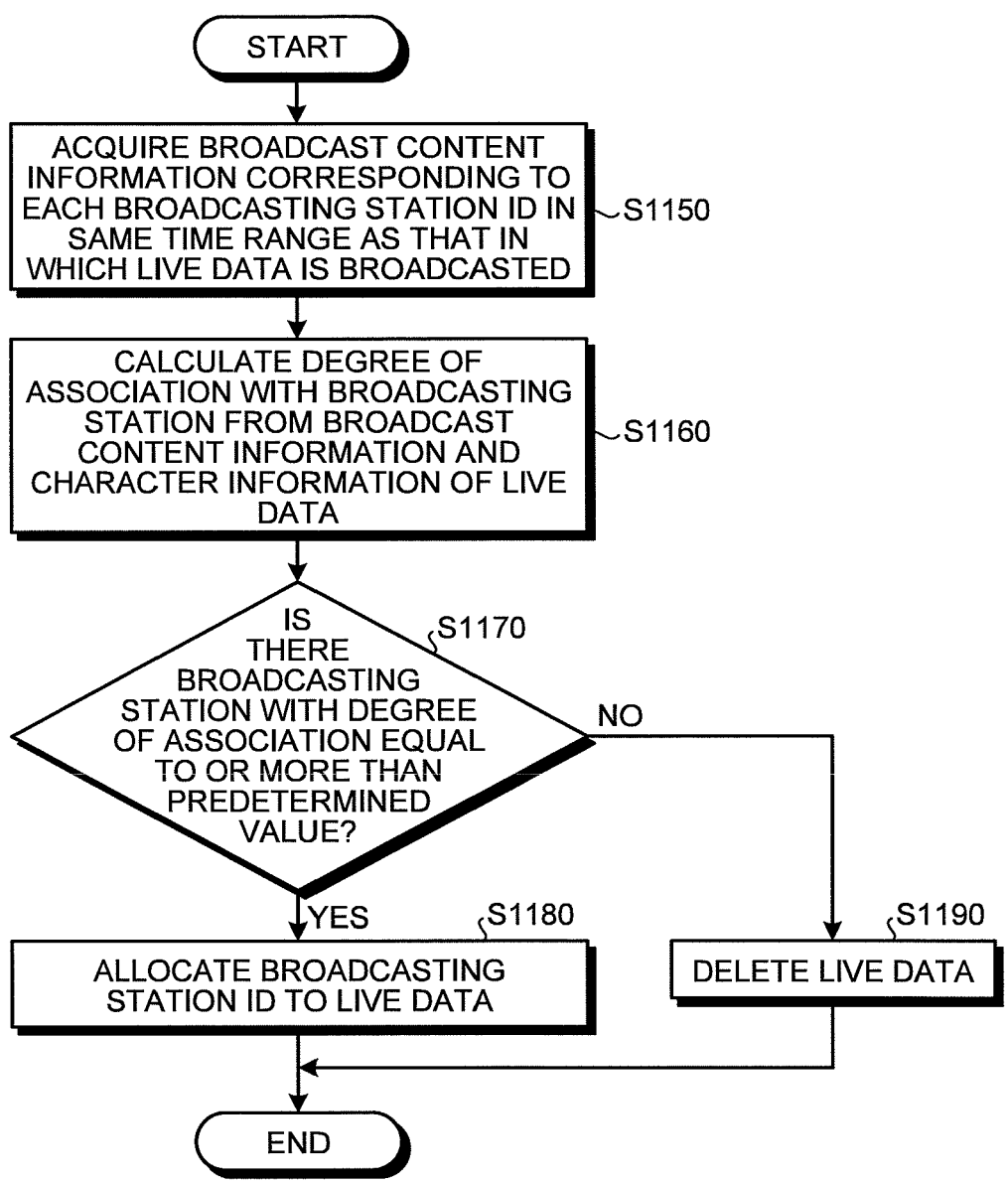
FIG. 17 is a flowchart illustrating the flow of the process of a broadcasting station identifying unit according to the second embodiment of the present invention.

FIG. 16 is a diagram illustrating an example of the format of the broadcast content information storage unit 123, in which a combination of the broadcasting station ID, the broadcasting time, and a title and a performer, which are broadcast content information, is stored. For example, the broadcasting station ID of the broadcasting station is broadcasting station 1, the title of broadcast content broadcasted for the time slot "2010-11-11 15:00:00 to 15:35:00" is "ハイパーニュース (HyperNews)", and the performer is "日本太郎 (Nippon Taro)". The broadcasting station identifying unit 135 allocates a broadcasting station ID to live data on the basis of the live data received by the live data receiving unit 130 and the broadcast content information stored in the broadcast content information storage unit 123. The flow of the process of the broadcasting station identifying unit 135 will be described with reference to the flowchart of FIG. 17.

First, the broadcasting station identifying unit 135 acquires broadcast content information, which is the broadcasting time including the posting date and time of the live data to which the broadcasting station ID is allocated, for each broadcasting station ID from the posting date and time with reference to the broadcast content information storage unit 123 (Step S1150). For example, in a case in which the posting date and time of the live data is 2010-11-11 15:10:00 and the example of the broadcast content information storage unit illustrated in FIG. 16 is used, since the broadcasting time "2010-11-11 15:00:00 to 15:35:00" of the broadcasting station with the broadcasting station ID "broadcasting station 1" includes 15:10:00, broadcast content information related to the broadcasting time is acquired as the broadcast content information corresponding to the broadcasting station ID "broadcasting station 1". In other words, "ハイパーニュース (HyperNews)" is acquired as the title and "日本太郎 (Nippon Taro)" is acquired as the performer. Since the broadcasting time "2010-11-11 15:00:00 to 16:00:00" of the broadcasting station with a broadcasting station ID "broadcasting station 2" includes 15:10:00, broadcast content information related to the broadcasting time is acquired as the broadcast content information corresponding to the broadcasting station ID "broadcasting station 2". That is, "我が家の害虫対策 (Measures against noxious insects at our home)" is acquired as the title and "北海次郎 (Hokkai Jiro)" is acquired as the performer. The above-mentioned process is performed for each unique broadcasting station ID.

Then, the broadcasting station identifying unit 135 calculates the degree of association between the live data and the broadcasting station ID from the character information of the live data and the broadcast content information for each broadcasting station ID which is acquired in Step S1150 (Step S1160). The degree of association is calculated as follows.

The character string of the broadcast content information acquired for each broadcasting station ID is compared with the character string of the character information of the live data. When the character strings coincide with each other, the degree of association with the broadcasting station ID is added by a value corresponding to the length of the character string.

For example, when the character information of the live data indicates "今、ハイパーニュースを見ています (Now, I am watching HyperNews)", in the example illustrated in FIG. 16, "HyperNews", which is the title corresponding to the broadcasting station ID "broadcasting station 1", is included as a partial character string. In this case, since the length of the character string "ハイパーニュース (HyperNews)" is 8 Japanese characters, the degree of association of "broadcasting station 1" with the live data is increased by 8. In a case in which the character information of the live data indicates "害虫嫌だよね (You hate noxious insects)", since the title corresponding to the broadcasting station ID "broadcasting station 2" is "我が家の害虫対策 (Measures against noxious insects at our home)" in the example illustrated in FIG. 16, the partial character strings "害虫 (noxious insects)" match. Since the length of the character string "害虫 (noxious insects)" is 2 Japanese characters, the degree of association of "broadcasting station 2" with the live data is increased by 2.

This character string comparison process is performed for each broadcasting station ID and all of the acquired broadcast content information items to calculate the degree of association between the live data and the broadcasting station ID.

Then, the broadcasting station identifying unit 135 determines whether there is a broadcasting station ID with the degree of association equal to or more than a predetermined threshold value in the degrees of association calculated in Step S1160 (Step S1170). When it is determined that there is a broadcasting station ID with the degree of association equal to or more than the predetermined threshold value, the process proceeds to Step S1180. When it is determined that there is no broadcasting station ID with the degree of association equal to or more than the predetermined threshold value, the process proceeds to Step S1190.

When the conditions of Step S1170 are satisfied, the broadcasting station identifying unit 135 associates a broadcasting station ID with the highest degree of association among the broadcasting station IDs with the degree of association equal to or more than the predetermined threshold value with the live data (Step S1180).

On the other hand, when the conditions of Step S1170 are not satisfied, the broadcasting station identifying unit 135 deletes the live data (Step S1190). The above-mentioned process is performed for all of the live data items received by the live data receiving unit 130.

When the degree of association is calculated in Step S1160, a weight may be set to each broadcast content information item. For example, when there is a character string which coincides with the title, the length of the identical character string is multiplied by 1.2; and when there is a character string which coincides with the performer information, the length of the character string is multiplied by 1.5.

When the length of an identical partial character string does not satisfy a predetermined value, a threshold value may be set such that the degree of association does not increase. For example, in a case in which the partial character string is equal to or less than 2 Japanese characters and the degree of association does not increase, since "害虫 (noxious insects)" is 2 Japanese characters, the degree of association with "broadcasting station 2" does not increase.

When there is a specific character string in the character information of the live data, the degree of association may increase. For example, when there is a character string "Zyx television" in the character information of the live data, a process of increasing the degree of association with "broadcasting station 1" by a predetermined value is performed.

In addition, morphological analysis may be performed on both the character information of the live data and the broadcast content information to compare only nouns. A synonym dictionary or an association word dictionary may be used and the degree of association may increase when there is a synonym or an association word. For example, in a case in which a character string "cockroach" is included in the character information of the live data and there is a character string "noxious insect" as an association word, since the character string is identical to a partial character string "noxious insect" in the title "Measures against noxious insects at our home" corresponding to "broadcasting station 2" in the example of FIG. 16, the degree of association between the live data and "broadcasting station 2" increases.

A series of processes of the broadcasting station identifying unit 135 is not limited to the above, but other methods may be used as long as they can associate the live data with the broadcasting station.

The above is the detailed description of the broadcasting station identifying unit 135.

Returning to FIG. 12, the chapter candidate selecting unit 140A causes the user to select live data to be imported as a chapter from the live data items received by the live data receiving unit 130, similarly to the chapter candidate selecting unit 140 according to the first embodiment. The chapter candidate selecting unit 140A presents information about the broadcasting station ID allocated by the broadcasting station identifying unit 135 for each live data item on the user interface screen for prompting the user to select live data.

Figure 18:
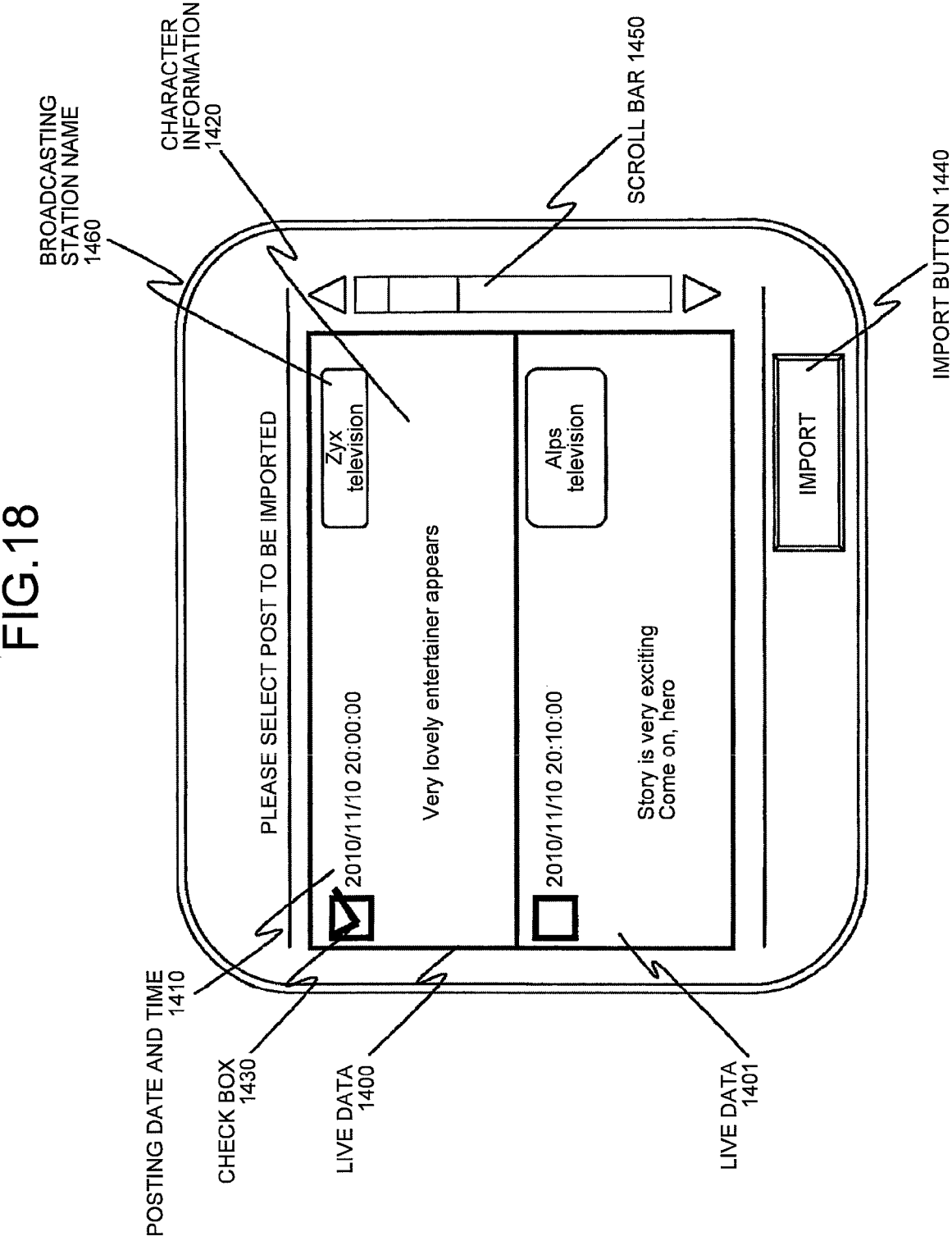
FIG. 18 is a diagram illustrating an example of a user interface presented by a chapter candidate selecting unit according to the second embodiment of the present invention.

FIG. 18 illustrates an example of the user interface presented by the chapter candidate selecting unit 140A. In FIG. 18, a broadcasting station name 1460 is added, as compared to the user interface screen illustrated in FIG. 6. For the broadcasting station name 1460, the broadcasting station name corresponding to the broadcasting station ID allocated by the broadcasting station identifying unit 135 is acquired from the broadcasting station information storage unit 122 and is then displayed. As such, when the broadcasting station name is presented, the user can understand which broadcasting station is referred to by the live data.

In the second embodiment, the broadcasting station name is displayed. However, broadcast content information, such as a title or a performer, may be displayed with reference to the broadcast content information storage unit 123.

The chapter creating unit 150A creates chapter data from the live data selected by the chapter candidate selecting unit 140A and stores the chapter data in the chapter storage unit 121A. Similarly to the chapter creating unit 150 according to the first embodiment, the chapter creating unit 150A creates the chapter date and time and a chapter header, creates data, which is a combination of the chapter date and time, the chapter header, and the broadcasting station ID associated by the broadcasting station identifying unit 135 as chapter data, and stores the chapter data in the chapter storage unit 121A.

The above is the description of the chapter creating device 12.

Figure 19:
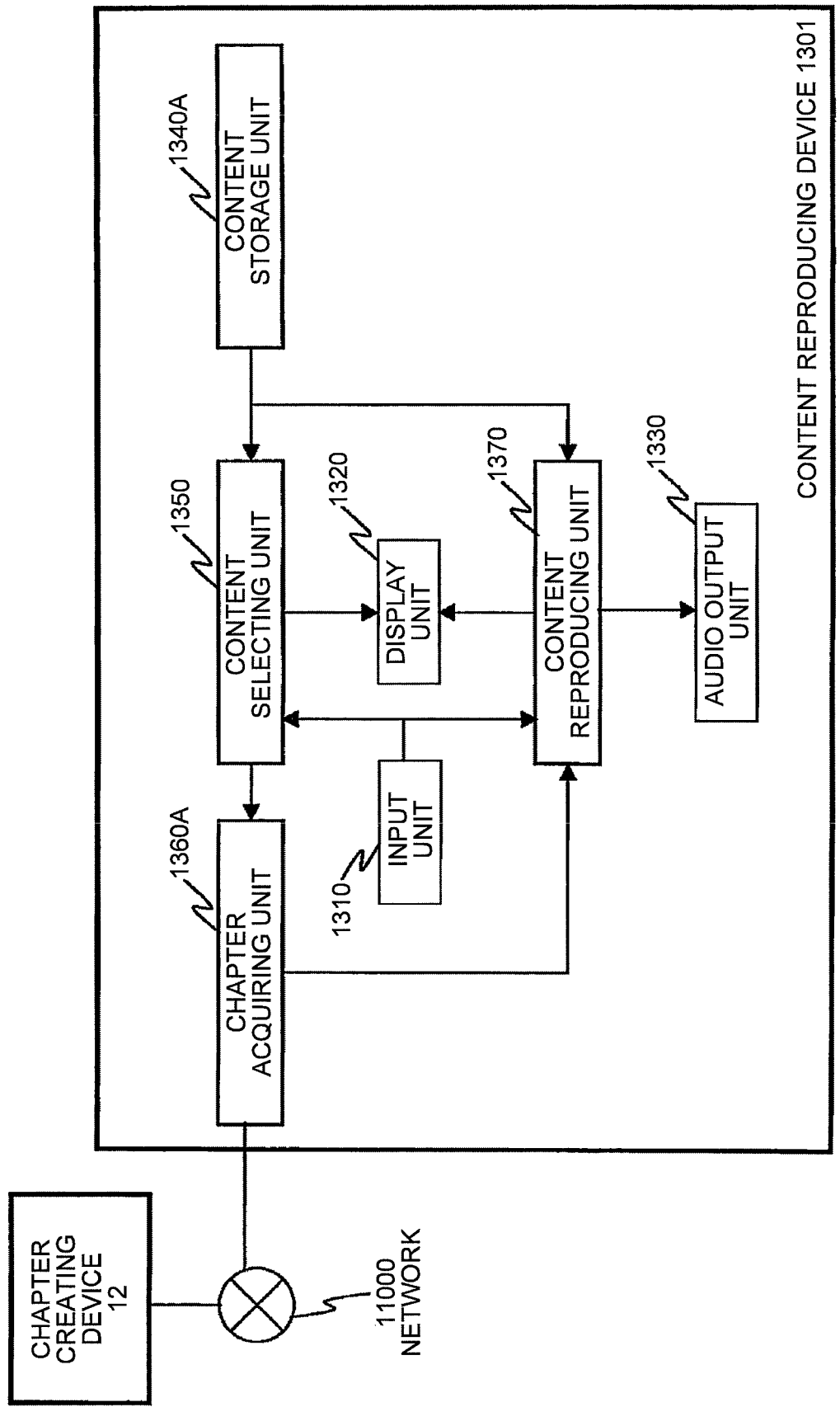
FIG. 19 is a block diagram illustrating the structure of a content reproducing device according to the second embodiment of the present invention.

Next, the content reproducing device 1301 will be described. FIG. 19 is a block diagram illustrating the structure of the content reproducing device 1301 according to the second embodiment. Since the content reproducing device 1301 differs from the content reproducing device 1300 in the operation of the content storage unit 1340 and the chapter acquiring unit 1360, in the content reproducing device 1301 a content storage unit 1340A and a chapter acquiring unit 1360A are included. The other structures are similar to those in the content reproducing device 1300 and the description thereof will be omitted.

Similarly to the content storage unit 1340 according to the first embodiment, the content storage unit 1340A stores: a combination of reproducible digital content, such as screen image data or audio data, an association start date and time, which is the start date and time of association with the digital content, the length of the reproduction time of the digital content, and the title of the digital content; and also stores the broadcasting station ID of the broadcasting station which broadcasted the digital content.

FIG. 20 is a diagram illustrating an example of the format of the content storage unit 1340A. The content storage unit 1340A further stores the broadcasting station ID: in addition to the content ID; content association start date and time; and content reproduction time length, which are similar to those stored in the content storage unit 1340 illustrated in FIG. 9. For example, the title of digital content with the content ID "content ID1" is "HyperNews", the association start date and time is "2010-11-11 15:00:00", the reproduction time length is "00:35:00", that is, 35 minutes, and the broadcasting station ID is "broadcasting station 1".

In this embodiment, the broadcasting station ID stored in the content storage unit 1340A is similar to that stored in the broadcasting station information storage unit 122 of the chapter creating device 12. However, an independent broadcasting station ID may be used as long as it is compatible with the broadcasting station ID stored in the broadcasting station information storage unit 122 of the chapter creating device 12.

The chapter acquiring unit 1360A acquires, from the chapter creating device 12, chapter data which is included in the range from the association start date and time of the digital content selected by the content selecting unit 1350 to the reproduction time length of the content and has the same broadcasting station ID.

For example, in the example of the content storage unit 1340A illustrated in FIG. 20, when content ID1 is selected by the content selecting unit 1350, the chapter acquiring unit 1360A acquires chapter data which is included in the period from 2010-11-11 15:00:00 to 2010-11-11 15:35:00 and is broadcasted by the broadcasting station with the broadcasting station ID "broadcasting station 1" from the chapter creating device 12 on the basis of the association start date and time and the reproduction time length corresponding to content ID1.

According to the chapter creating device 12 and the content reproducing device 1301, when the digital content to be reproduced is broadcast content, the chapter which is not related to the digital content is not displayed. Therefore, it is possible to improve the convenience of the chapter.

The broadcasting station information storage unit 122 of the chapter creating device 12 may be provided in an external server and return the broadcasting station ID or the broadcasting station name in response to a request. In addition, the broadcast content information storage unit 123 of the chapter creating device 12 may be provided in an external server and return the broadcast content information in response to a request.

In this embodiment, the broadcasting station associated with the live data is regarded as a broadcasting station with the highest degree of association by the broadcasting station identifying unit 135. However, the broadcasting station with the degree of association equal to or more than a threshold value may be associated with the live data. In this case, a plurality of broadcasting station IDs are possibly allocated to the live data. In this case, the broadcasting station names corresponding to the allocated broadcasting station IDs are displayed in the user interface of the chapter candidate selecting unit 140A illustrated in FIG. 14. When a plurality of broadcasting station IDs are allocated to the live data, a plurality of broadcasting station IDs are also allocated to the chapter data created from the live data. In this case, the chapter storage unit 121A stores all of the allocated broadcasting station IDs.

Third Embodiment

Figure 21:
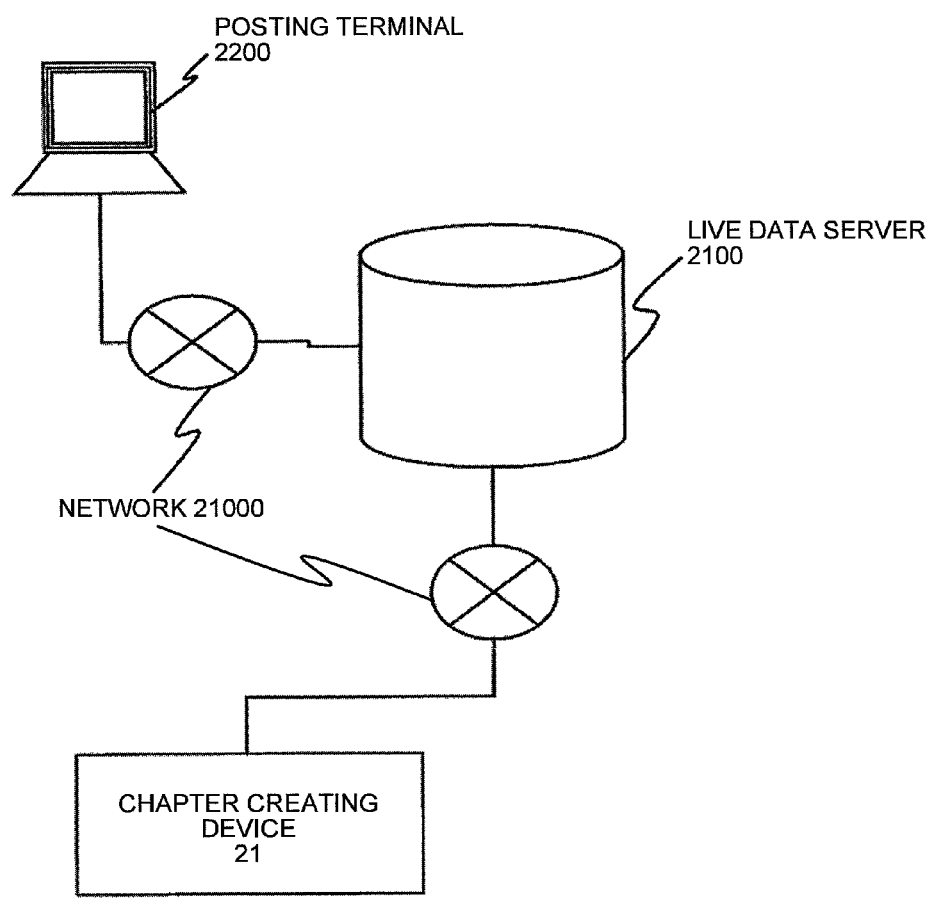
FIG. 21 is a system configuration diagram illustrating a third embodiment of the present invention.

FIG. 21 is a diagram illustrating the entire system of a third embodiment of the present invention, in which a chapter creating device 21 and a live data server 2100 are connected to each other through a network 21000 and the live data server 2100 is connected to a posting terminal 2200 through the network 21000.

The live data server 2100 is a server that accumulates data transmitted from the user who uses a service, which is represented by what is called an SNS (Social Networking Service), BBS (Bulletin Board System), or a blog (including a mini blog), and opens the data to other users. The data accumulated by the live data server includes character information expressing the feeling of the user at the time when the data is created. The live data server 2100 according to the third embodiment stores the character information transmitted by the posting terminal 2200 so as to be associated with the date and time when the character information is received. In addition, a plurality of live data servers 2100 may be provided.

Figure 22:
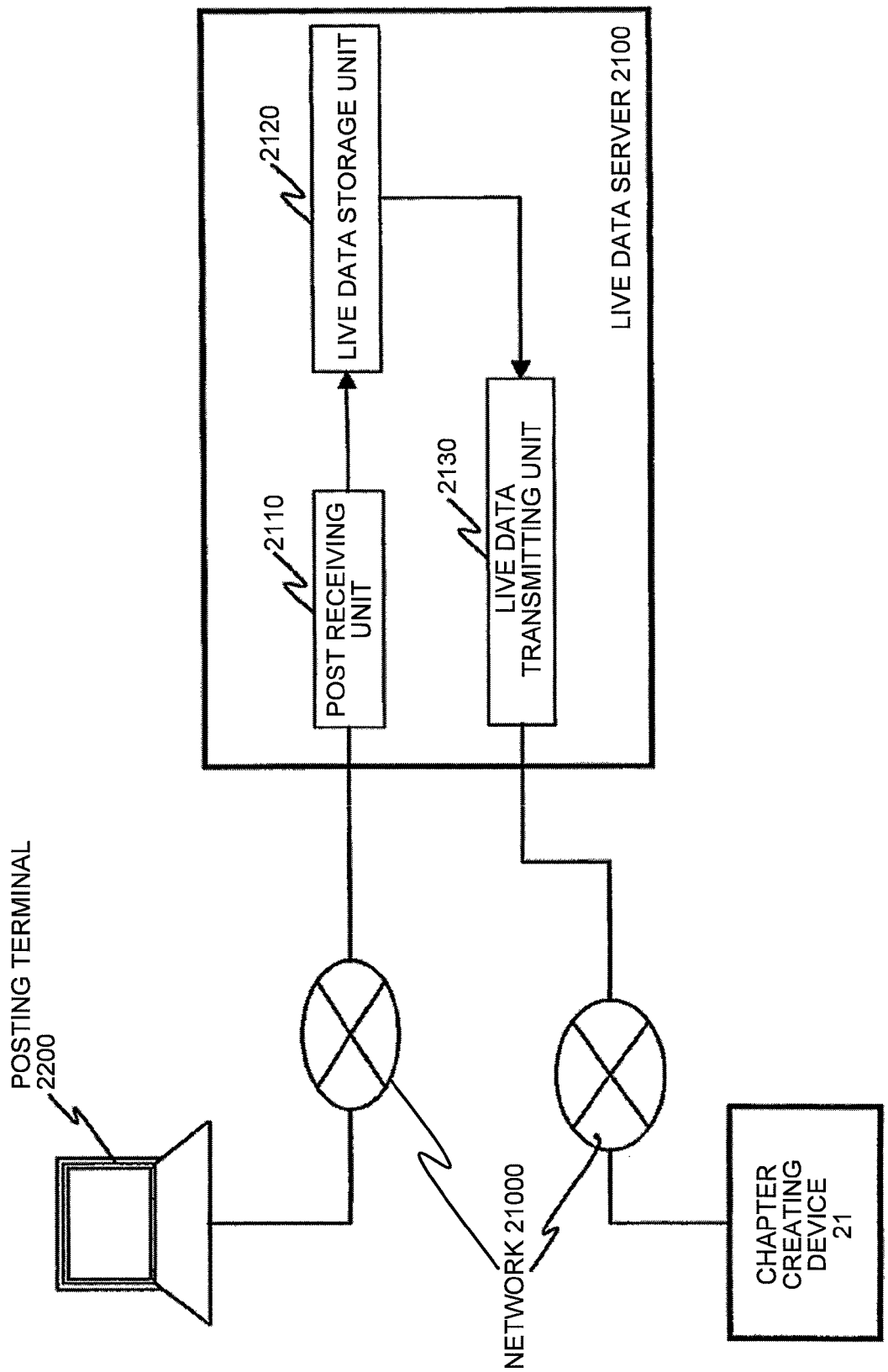
FIG. 22 is a block diagram illustrating the structure of a live data server according to the third embodiment of the present invention.

FIG. 22 is a block diagram illustrating the structure of the live data server 2100. The live data server 2100 includes a post receiving unit 2110, a live data storage unit 2120, and a live data transmitting unit 2130.

The post receiving unit 2110 receives character information transmitted from an external posting terminal 2200 via the network 21000 and stores the character information together with the posting date and time, which is the date and time when the character information is received, in the live data storage unit 2120. Hereinafter, data obtained by combining the character information with the posting date and time of the character information is referred to as live data.

The live data storage unit 2120 is a database which stores the live data.

The live data transmitting unit 2130 transmits the live data stored in the live data storage unit 2120 through the network 21000. In addition, when the search conditions of the live data, such as the range of the posting date and time or a character string included in the character information are designated by the chapter creating device 21, the live data transmitting unit 2130 transmits only the live data that satisfies the search conditions to the chapter creating device 21.

The above is the description of the live data server 2100. The number of live data servers 2100 is not limited to one, but may be two or more.

The posting terminal 2200 a terminal that includes: an input interface and a display for editing the character information of a general PC or a portable information terminal; and a communication unit for transmitting the character information to the live data server 2100. A plurality of posting terminals 2200 may be provided. One or a plurality of users may use the posting terminals 2200.

Next, the chapter creating device 21 will be described.

Figure 23:
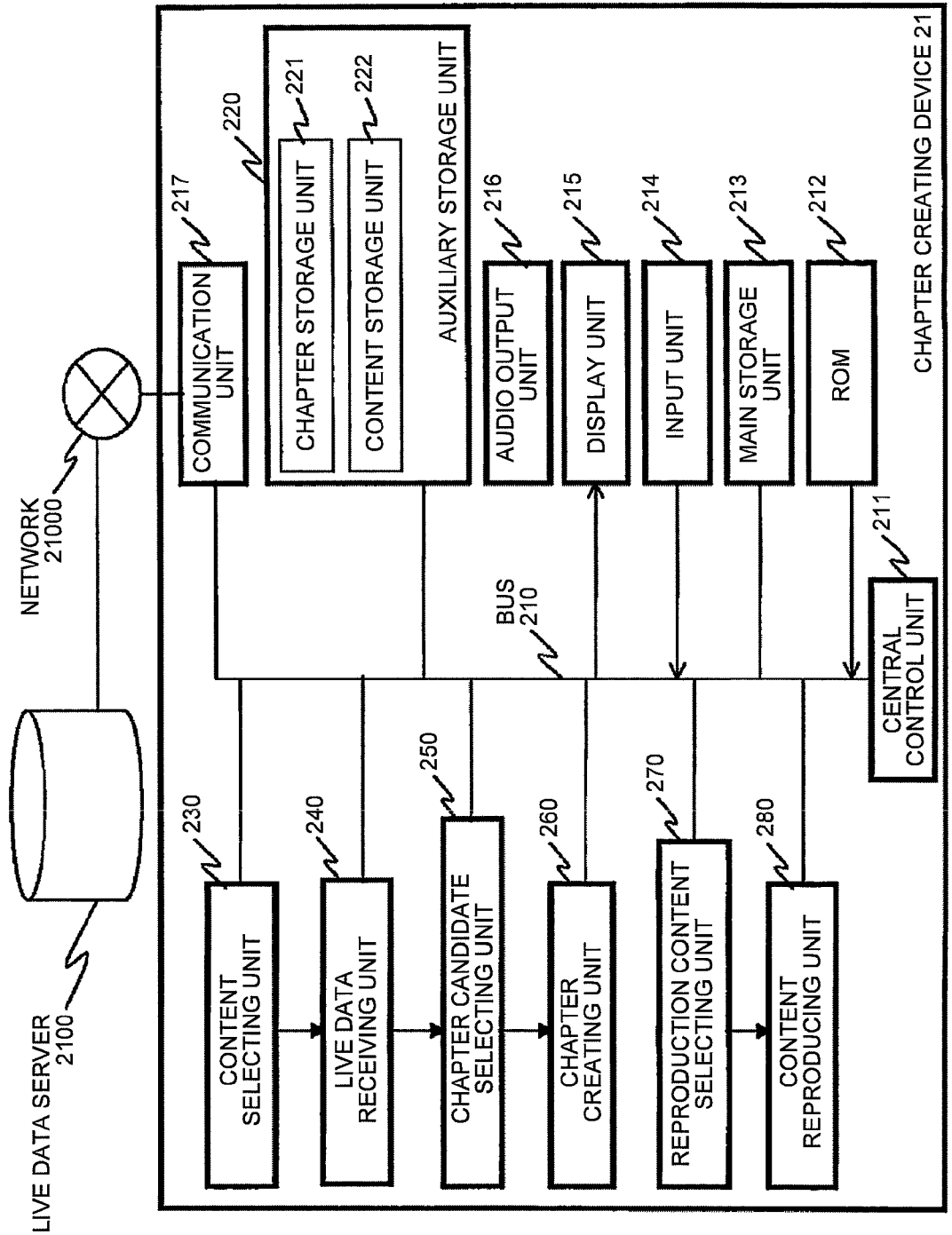
FIG. 23 is a block diagram illustrating the structure of a chapter creating device according to the third embodiment of the present invention.

FIG. 23 is a block diagram illustrating the preferred structure of the chapter creating device 21 according to the third embodiment. The chapter creating device 21 includes: a central control unit 211; a ROM 212, a main storage unit 213; an input unit 214; a display unit 215; an audio output unit 216; a communication unit 217; an auxiliary storage unit 220; a content selecting unit 230; a live data receiving unit 240; a chapter candidate selecting unit 250; a chapter creating unit 260; a reproduction content selecting unit 270; and a content reproducing unit 280 which are connected to one another via a bus 210. The communication unit 217 is connected to the live data server 2100, which is an external device, by the network 21000.

In FIG. 23, the chapter creating device 21 is illustrated as a hardware component using a functional block diagram. However, the entire chapter creating device 21 may be one software program and may be softwarily implemented on a PC provided with a memory or a CPU.

The flow of a chapter creating process by the chapter creating device 21 will be described below with reference to the flowchart illustrated in FIG. 24.

First, the content selecting unit 230 presents a user interface on the display unit 215 and causes the user to select digital content which is desired to be associated with a chapter (Step S210).

Then, the live data receiving unit 240 receives live data from the live data server 2100 via the network 21000 (Step S220).

Then, the chapter candidate selecting unit 250 selects live data, which is the original data for creating a chapter, from the live data items received by the live data receiving unit 240 (Step S230).

Then, the chapter creating unit 260 creates a chapter from the live data selected by the chapter candidate selecting unit 250 (Step S240).

Then, the chapter creating unit 260 stores the created chapter in a chapter storage unit 221 (Step S250).

The above is the flow of the chapter creating process by the chapter creating device 21.

Figure 25:
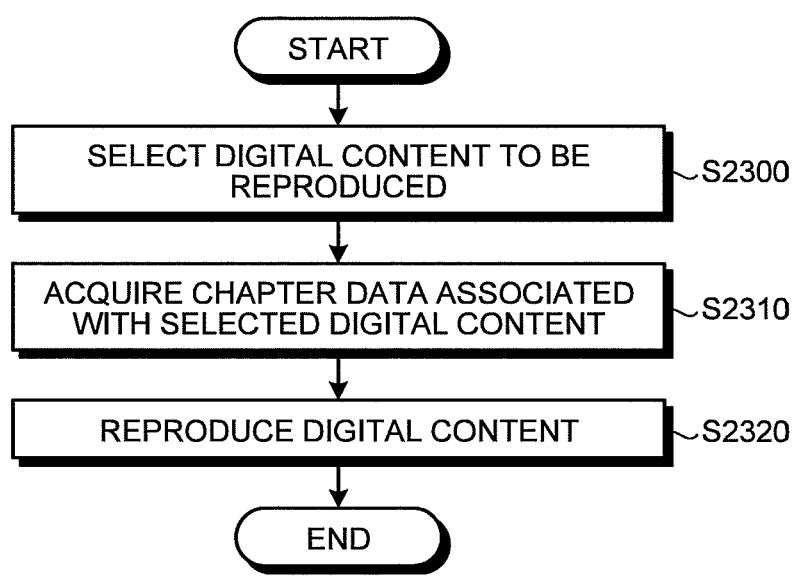
FIG. 25 is a flowchart illustrating the flow of the process of the chapter creating device according to the third embodiment of the present invention when performing reproduction using a chapter.

Next, the flow of the process of the chapter creating device 21 performing reproduction using the created chapter will be described with reference to the flowchart illustrated in FIG. 25.

First, the reproduction content selecting unit 270 displays a user interface screen on the display unit 215 and causes the user to select digital content to be reproduced via the input unit 214 (Step S2300).

Then, the content reproducing unit 280 acquires chapter data included in the range of the recording date and time of the digital content selected in Step S2300 from the chapter storage unit 221 (Step S2310).

Then, the content reproducing unit 280 starts the reproduction of the digital content selected in Step S2300, displays the chapter acquired in Step S2310 on the display unit 215, and presents the user interface capable of inputting the chapter via the input unit 214 (Step S2320).

The above is the flow of the reproduction process by the chapter creating device 21 using the chapter.

Next, each unit of the chapter creating device 21 will be described in detail. The central control unit 211 is a unit that controls the overall operation of the chapter creating device 21 and includes a CPU (Central Processing Unit), a PLD (Programmable Logic Device) and the like. The ROM 212 is read only memory and stores a basic control program for controlling the overall operation of the chapter creating device 21. The main storage unit 213 is a work area which is used by the central control unit 211 to execute a program and is, for example, RAM. The input unit 214 is, for example, a keyboard, a mouse, or a touch panel and receives an input from the user. The display unit 215 is, for example, a CRT or a liquid crystal display and displays information to the user. The audio output unit 216 converts a digital audio signal into an analog signal, amplifies the analog signal, and outputs the amplified signal to, for example, an external speaker or a headphone. The communication unit 217 is, for example, a network card and communicates with an external network.

The auxiliary storage unit 220 is a high-capacity storage medium, such as an HDD (Hard Disk Drive) or an SSD (Solid State Drive), and therein further includes a chapter storage unit 221 and a content storage unit 222.

The chapter storage unit 221 stores chapter data, which is a combination of a chapter date and time indicating the date and time of the chapter, a header character string, and a content ID. The content ID is an identifier for uniquely identifying digital content. Basically, for the chapter date and time, date and time data based on UTC (Universal Time Coordinated) is stored. However, the chapter date and time is not limited to the date and time data based on UTC, but any date and time data may be stored as long as it can be converted into UTC. For example, data indicating JST (Japan Standard Time) may be used, or numerical data indicating Unix (registered trademark) time, which is relative time from Jan. 1, 1970 00:00:00 UTC, may be used.

FIG. 26 is a diagram illustrating an example of the format of the chapter storage unit 221, in which the chapter date and time, which is chapter data, the content ID, and the header character string are stored. In FIG. 26, a chapter ID, which is an identifier for identifying each chapter data item, is stored so as to be associated with each chapter data item. For example, the chapter date and time of chapter data with a chapter ID "chapter 1" is "2010-11-10 15:10:00", the content ID is "content ID1", and the header character string is "I cannot stand the impudence of the cat". The chapter data items with the chapter IDs "chapter ID1" and "chapter ID2" have the same content ID "content ID1", which indicates that the chapter data items with the chapter IDs "chapter ID1" and "chapter ID2" are associated with content with the content ID "content ID1".

The content storage unit 222 stores a combination of reproducible digital content, such as screen image data or audio data, an association start date and time, which is the start date and time of association with the digital content, the length of the reproduction time of the digital content, and the title of the digital content. For the association start date and time, when the digital content is broadcast content, the date and time when the content started is stored and, when the digital content is personal screen image content, the date and time when the recording of the content started is stored.

FIG. 27 is a diagram illustrating an example of the format of the content storage unit 222 that stores combination of the content ID, the association start date and time, and a reproduction time length. The content ID is an identifier for identifying digital content; and the reproduction time is the length of the content reproduction time. For example, the title of digital content with a content ID "content ID1" is "Hyper-News", the association start date and time is "2010-11-11 15:00:00", and the reproduction time length is "00:35:00", that is, 35 minutes.

Figure 28:
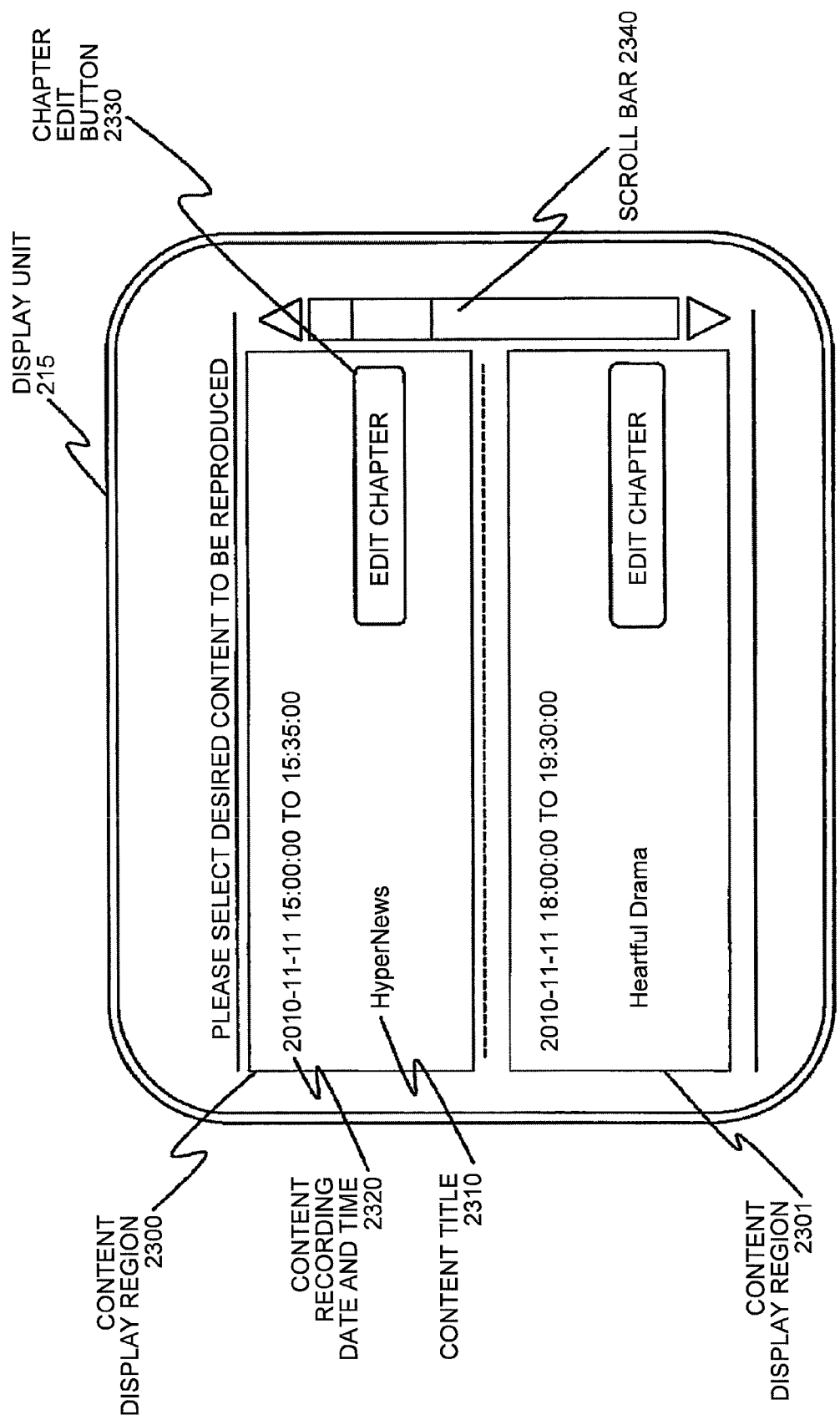
FIG. 28 is a diagram illustrating an example of a user interface presented by a content selecting unit according to the third embodiment of the present invention.

The content selecting unit 230 causes the user to select the digital content to be reproduced via the input unit 214. In order to help the user input information, the content selecting unit 230 displays the user interface screen on the display unit 215 to cause the user to select the digital content to be reproduced. FIG. 28 is a diagram illustrating an example of the user interface screen presented by the content selecting unit 230.

In FIG. 28, information with the content ID "content ID1" illustrated in FIG. 27 is displayed in a content display region 2300 and information with the content ID "content ID2" illustrated in FIG. 27 is displayed in a content display region 2301. Since the content display region 2300 and the content display region 2301 are constituted by the similar components, only the content display region 2300 will be described. A content title 2310 in the content display region 2300 is a region in which the title of content is displayed and the title "HyperNews" with the content ID "content ID1" is displayed in the content title 2310. A content recording date and time 2320 in the content display region 2300 is a region in which the period from the date and time when the recording of content starts to the date and time when the recording of content ends is displayed, and "2010-11-11 15:00:00 to 15:35:00" is displayed in the content recording date and time 2320. A chapter edit button 2330 is a button that is pressed down by the user to edit the chapter with the content ID "content ID1". When the button is pressed down, the content selecting unit 230 selects the content ID "content ID1" and transfers the process to the live data receiving unit 240.

When a scroll bar 2340 is scrolled, information in the content display region 2300 and the content display region 2301 is changed depending on the amount of scroll. The user operates the scroll bar 2340 to search for content and presses down the chapter edit button corresponding to content which is desired to be edited.

The live data receiving unit 240 receives live data within the time range determined by the association start date and time and the reproduction time length of the digital content selected by the content selecting unit 230 from the live data server 2100 which is connected via the network 21000 by the communication unit 217. Specifically, in a case in which the content selecting unit 230 selects content ID1 in the example of the content storage unit 222 illustrated in FIG. 27, since the association start date and time of content ID1 is 2010-11-11 15:00:00 and the reproduction time length is 00:35:00, that is, 35 minutes, live data having the posting date and time from 2010-11-11 15:00:00 to 2010-11-11 15:35:00 is received from the live data server 2100.

When there are a plurality of live data servers 2100, the designer of the chapter creating device 21 basically sets one of the live data servers 2100 from which live data will be received in advance. However, the live data may be received from all of the live data servers 2100.

The chapter candidate selecting unit 250 causes the user to select live data to be imported as a chapter out of the live data items received by the live data receiving unit 240. When prompting the user to perform the selection operation, the chapter candidate selecting unit 250 presents the user interface to the user for assisting the selection.

Figure 29:
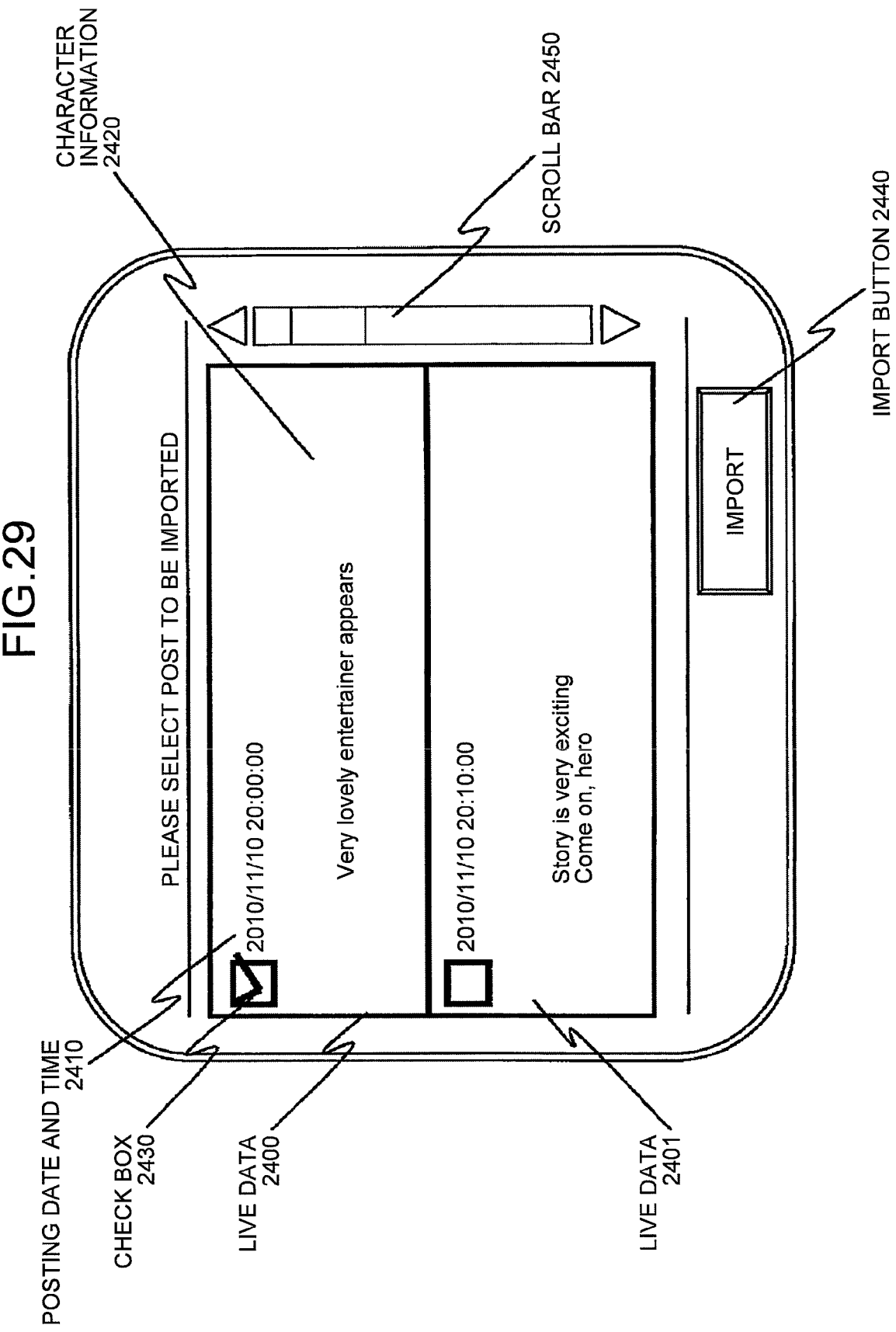
FIG. 29 is a diagram illustrating an example of a user interface presented by a chapter candidate selecting unit according to the third embodiment of the present invention.

FIG. 29 is a diagram illustrating the user interface for selecting the live data to be imported as a chapter, in which live data 2400 and live data 2401 are displayed on the display unit 215. The other live data items may be displayed by scrolling a scroll bar 2450 illustrated in FIG. 29. A posting date and time 2410 is the date and time when the live data 2400 is posted, which is 2010-11-10 20:00:00. Character information 2420 is the character information of the live data 2400 and indicates "A very lovely entertainer appears". A check box 2430 is a component of the user interface for setting whether to import the live data 2400 as a chapter. When the check box 2430 is checked, it indicates that the live data 2400 is imported as a chapter. The check state of the check box 2430 may be changed by the user. In the example illustrated in FIG. 29, since the check box 2430 is checked, it indicates that the live data 2400 is imported as a chapter. The other live data items are constituted by similar components as those of the live data 2400. In other words, the posting date and time of each live data item, the character information, and the check box are arranged. When an import button 2440 illustrated in FIG. 29 is pressed down by the user, the chapter candidate selecting unit 250 acquires the selected live data, which is the live data whose check box is checked, and transmits the live data to the chapter creating unit 260.

The chapter creating unit 260 creates a chapter from the content ID selected by the content selecting unit 230 and the live data selected by the chapter candidate selecting unit 250, and stores the chapter in the chapter storage unit 221. Specifically, the chapter creating unit 260 creates chapter data by combining: the chapter date and time as the posting date and time of the live data; the character information of the live data as a chapter header; and the selected content ID. At this time, a unique chapter ID other than the chapter IDs stored in the chapter storage unit 221 is allocated to the created chapter data. When the creation of the chapter data is completed, the chapter creating unit 260 stores the created chapter data in the chapter storage unit 221. When the chapter data is created, the chapter creating unit 260 may edit the chapter data such that the length of the characters in the chapter header is equal to or less than a predetermined value, for example, 20 characters.

Figure 24:
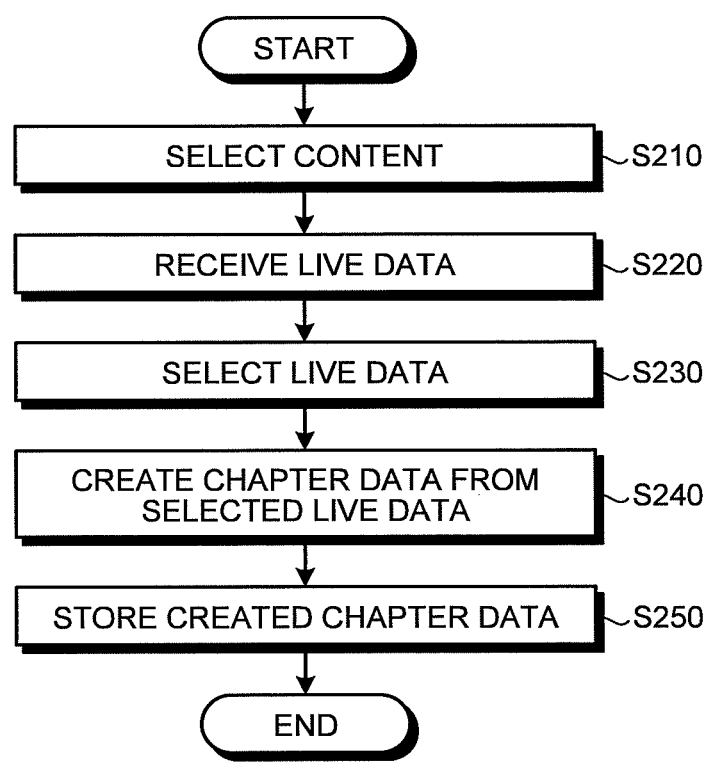
FIG. 24 is a flowchart illustrating the flow of the process of the chapter creating device according to the third embodiment of the present invention.

The content selecting unit 230, the live data receiving unit 240, the chapter candidate selecting unit 250, and the chapter creating unit 260 are units that perform the chapter creating process illustrated in the flowchart of FIG. 24. Next, the reproduction content selecting unit 270 and the content reproducing unit 280 for performing the chapter reproducing process illustrated in the flowchart of FIG. 25 will be described.

Figure 30:
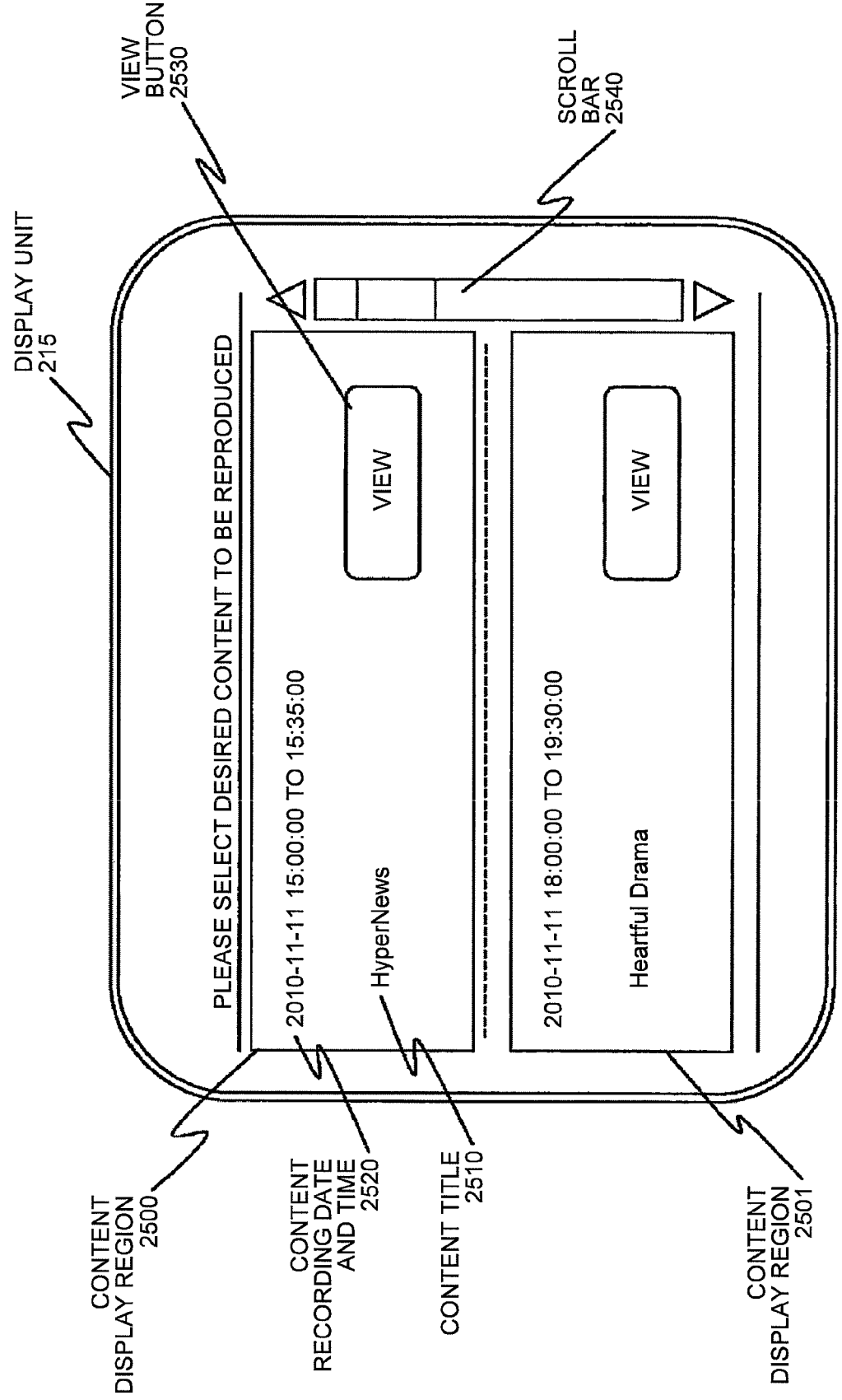
FIG. 30 is a diagram illustrating an example of a user interface presented by a reproduction content selecting unit according to the third embodiment of the present invention.

The reproduction content selecting unit 270 causes the user to select digital content to be reproduced via the input unit 214. In order to help the user input information, the reproduction content selecting unit 270 displays the user interface screen on the display unit 215 and causes the user to select the digital content to be reproduced. FIG. 30 is a diagram illustrating an example of the user interface screen presented by the reproduction content selecting unit 270.

In FIG. 30, information with the content ID "content ID1" illustrated in FIG. 27 is displayed in a content display region 2500 and information with the content ID "content ID2" illustrated in FIG. 27 is displayed in a content display region 2501. Since the content display region 2500 and the content display region 2501 are constituted by the similar components, only the content display region 2500 will be described. A content title 2510 in the content display region 2500 is a region in which the title of digital content is displayed and the title "HyperNews" with the content ID "content ID1" is displayed in the content title 2510. A content recording date and time 2520 in the content display region 2500 is a region in which the period from the date and time when the recording of content starts to the date and time when the recording of content ends is displayed, and "2010-11-11 15:00:00 to 15:35:00" is displayed in the content recording date and time 2520. A view button 2530 is pressed down by the user when the user starts to view the content.

When a scroll bar 2540 is scrolled, the information in the content display region 2500 and the content display region 2501 is changed depending on the amount of scroll. The user operates the scroll bar 2540 to search for digital content and presses down the view button corresponding to digital content which is desired to be viewed, thereby starting to view the digital content.

The content reproducing unit 280 starts the reproduction of the digital content selected by the reproduction content selecting unit 270. In other words, the content reproducing unit 280 outputs screen image of the digital content to the display unit 215, and outputs sound of the digital content to the audio output unit 216. In addition, the content reproducing unit 280 displays the chapters associated with the selected digital content on the display unit 215 and presents the user interface which enables the user to select the chapters. The chapter data is acquired as follows. All of the chapter data items associated with the same content ID are acquired on the basis of the content ID of the digital content selected by the reproduction content selecting unit 270 with reference to the chapter storage unit 221.

When the user selects a chapter, the content reproducing unit 280 moves the reproduction position of the digital content to a position where the selected chapter is seen. Assuming the chapter date and time of the selected chapter is c and the association start date and time of the digital content is d, the reproduction position p of the digital content is calculated by the following Expression 2.

$$p = c - d \qquad (2)$$

The reproduction position p calculated by Expression 2 is the time when the head of the digital content is 0.

Figure 31:
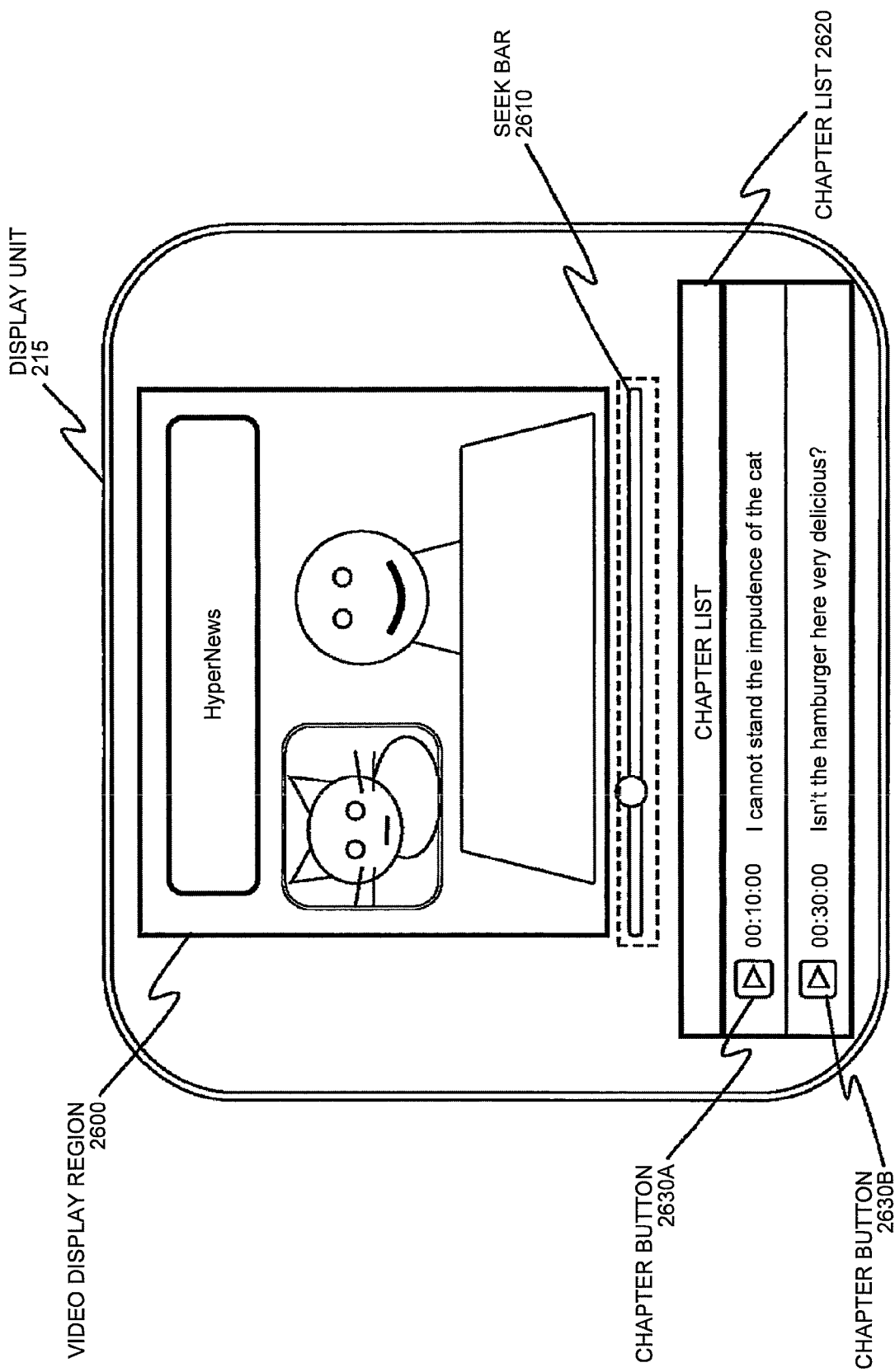
FIG. 31 is a diagram illustrating an example of a user interface presented by a content reproducing unit according to the third embodiment of the present invention.

FIG. 31 illustrates an example of the display of the user interface and the screen image data of content which are displayed on the display unit 215 by the content reproducing unit 280. In FIG. 31, a screen image display region 2600 is a region in which screen image of digital content to be reproduced is displayed. A seek bar 2610 is a controller which indicates information about the reproduction position of the digital content and also is a controller with which the user can control the reproduction position. A chapter list 2620 is displaying chapters related to the digital content which is being reproduced. In FIG. 31, two chapters "I cannot stand the impudence of the cat" and "Isn't the hamburger here very delicious?" are displayed. When a chapter button 2630A or a chapter button 2630B is pressed down by the user, the reproduction position is moved to the position of the chapter associated with the button. For example, when the chapter button 2630A is pressed down, the reproduction position is moved to a position which is "00:10:00" compared from the head of the digital content, that is, a position which is 10 minutes compared from the head of the digital content. When the chapter button 2630B is pressed down, the reproduction position is moved to a position which is "00:30:00" compared from the head of the digital content, that is, 30 minutes compared from the head of the digital content.

As illustrated in FIG. 31, even when the user does not perform a character input operation, information indicating "I cannot stand the impudence of the cat" or "Isn't the hamburger here very delicious?" is displayed as the header of the chapter. In addition, it is guessed that an impudent cat appears before and after the chapter from the character information indicating "I cannot stand the impudence of the cat", and it is guessed that there is a dialogue about a delicious hamburger before and after the chapter from the character string "Isn't the hamburger here very delicious?".

The above is the description of the chapter creating device 21. According to the above-mentioned chapter creating device 21, all the user needs to do is perform only an operation of checking interested live data while viewing the character information. Therefore, it is possible to create a chapter without performing a complicated operation, such as the input of characters, and set a chapter header indicating the outline of the chapter.

In the third embodiment, the chapter data is associated with the digital content by storing the content ID in the chapter storage unit 221. However, the chapter data may be associated with the digital content by making it possible to store the chapter ID in the content storage unit 222. In this case, the chapter creating unit 260 stores the chapter ID of the created chapter data in the content ID column of the corresponding content storage unit 222.

Fourth Embodiment

The system configuration of a fourth embodiment is similar to that of the third embodiment illustrated in FIG. 21 except for the structure of the chapter creating device 21. In the fourth embodiment, the chapter creating device 21 will be described as a chapter creating device 22.

In addition to the operation of the chapter creating device 21 according to the third embodiment, the chapter creating device 22 according to the fourth embodiment can create a chapter more simply by leaving only live data related to the selected content as a chapter selection candidate in accordance with the content of the character information of the live data.

Figure 32:
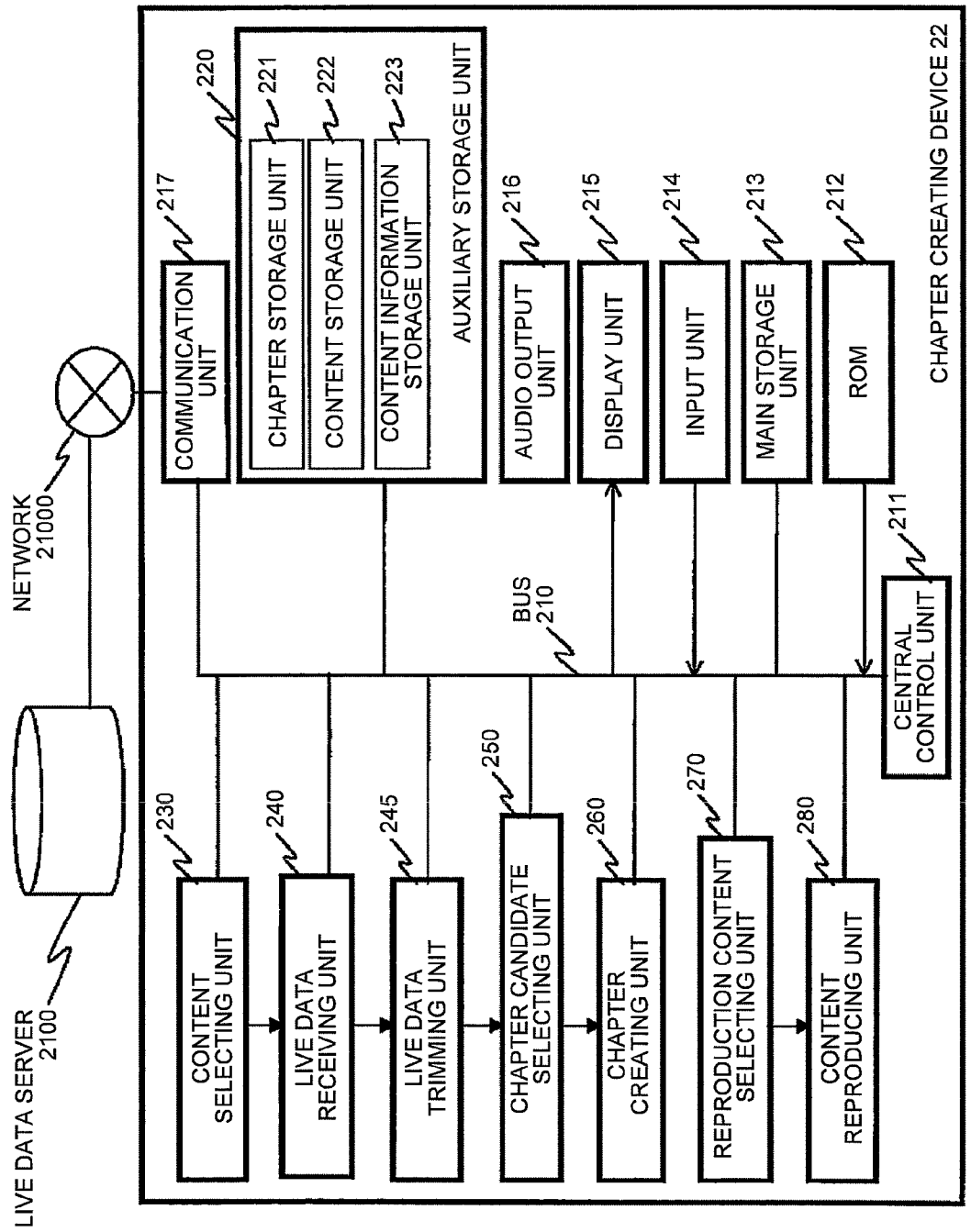
FIG. 32 is a block diagram illustrating the structure of a chapter creating device according to a fourth embodiment of the present invention.

FIG. 32 is a block diagram illustrating the structure of the chapter creating device 22 according to the fourth embodiment. The chapter creating device 22 differs from the chapter creating device 21 in that it further includes a live data pruning unit 245 and a content information storage unit 223 which is provided in an auxiliary storage unit 220. In the fourth embodiment, the content information storage unit 223 and the live data pruning unit 245 will be described, but description about the other components will be omitted since they are similar to those in the chapter creating device 21.

Figure 33:
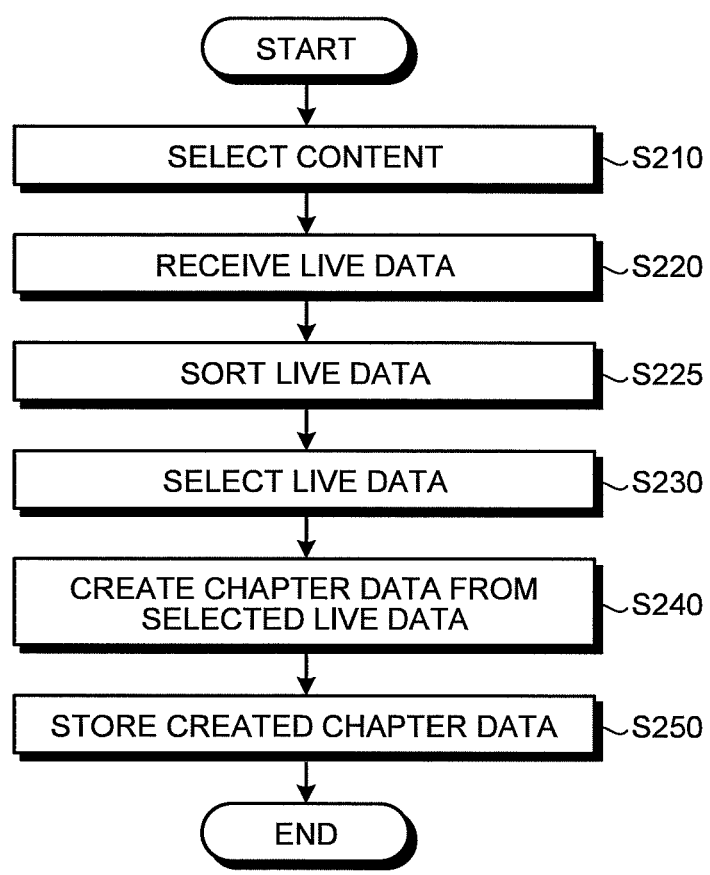
FIG. 33 is a flowchart illustrating the flow of the process of the chapter creating device according to the fourth embodiment of the present invention.

The flow of a chapter creating process by the chapter creating device 22 will be described with reference to the flowchart shown in FIG. 33.

First, a content selecting unit 230 of the chapter creating device 22 causes the user to select content which is desired to be associated with a chapter (Step S210). This process is similar to that in the chapter creating device 21.

A live data receiving unit 240 of the chapter creating device 22 receives live data from a live data server 2100 (Step S220). This process is similar to that in the chapter creating device 21.

Then, the live data pruning unit 245 of the chapter creating device 22 removes the live data items other than the live data which is related to the content selected in Step S210 from the live data items received in Step S220 (Step S225).

Then, a chapter candidate selecting unit 250 of the chapter creating device 22 causes the user to select live data which is desired to be imported as a chapter (Step S230). This process is similar to that in the chapter creating device 21.

Then, a chapter creating unit 260 of the chapter creating device 22 creates chapter data from the content selected in Step S210 and the live data selected in Step S230 (Step S240). This process is similar to that in the chapter creating device 21.

Then, the chapter creating unit 260 of the chapter creating device 22 stores the chapter data created in Step S240 in a chapter storage unit 221 (Step S250). This process is similar to that in the chapter creating device 21.

The above is the description of the flow of the chapter creating process by the chapter creating device 22.

Then, each unit of the chapter creating device 22 will be described in detail.

The content information storage unit 223 stores a combination of the content ID and content information, which is sub-information about content. The content information is data that indicates content, such as a title, a genre, a performer, a caption, and a broadcasting station bibliographically.

Figures 34, 35:
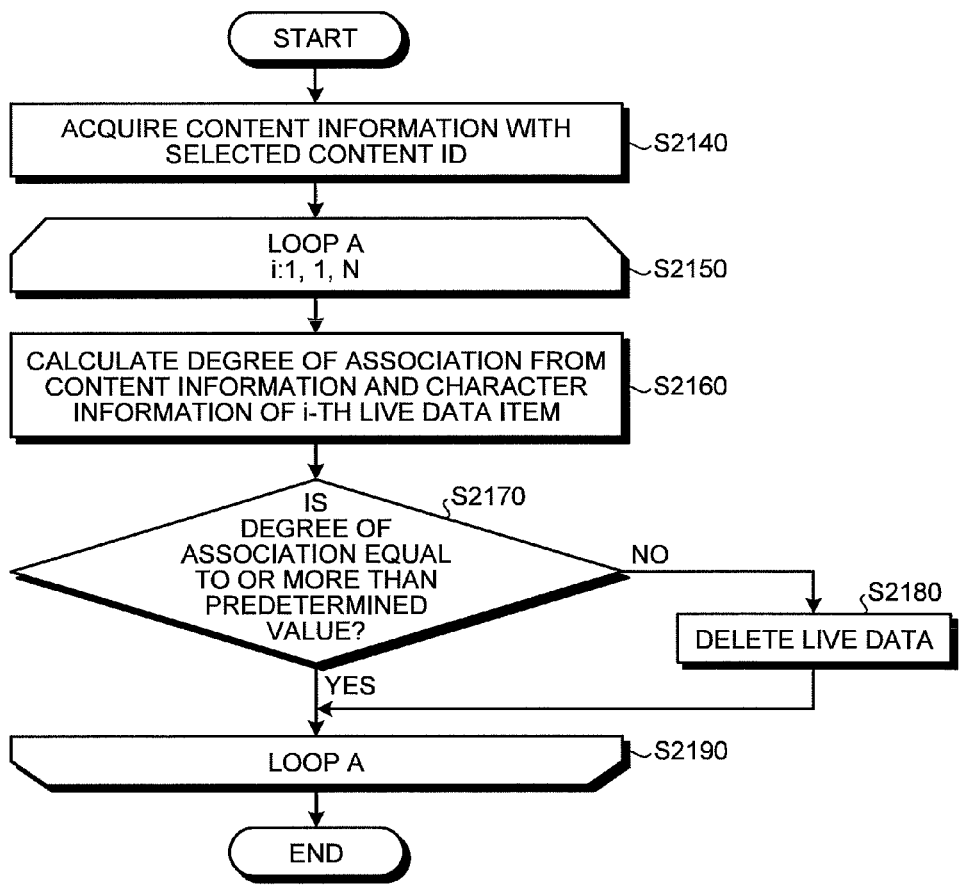
FIG. 34 is a diagram illustrating an example of the format of a content information storage unit according to the fourth embodiment of the present invention.
FIG. 35 is a flowchart illustrating the flow of the process of a live data pruning unit according to the fourth embodiment of the present invention.

FIG. 34 is a diagram illustrating an example of the format of the content information storage unit 223, in which the content ID and the content information are stored and a combination of the title and the performer is stored as the content information. For example, the title of content with a content ID "content ID1" is "HyperNews" and the performer is "Nippon Taro".

The live data pruning unit 245 calculates the degree of association of the live data with the content from the live data received by the live data receiving unit 240 and the content information stored in the content information storage unit 223 and transmits the live data with the degree of association equal to or more than a threshold value to the chapter candidate selecting unit 250. The flow of the process of the live data pruning unit 245 will be described with reference to the flowchart shown in FIG. 35.

First, the live data pruning unit 245 acquires content information with a content ID identical to the content ID selected by the content selecting unit 230 with reference to the content information storage unit 223 (Step S2140). For example, when the content selecting unit 230 selects the content ID "content ID1", the live data pruning unit 245 acquires "HyperNews" as the title and "Nippon Taro" as the performer in the example of the content information shown in FIG. 34.

Step S2150 is a loop symbol and indicates that, when the number of live data items received by the live data receiving unit 240 is N, the loop counter i of an initial value 1 is increased by 1 until it reaches N whenever a loop A is repeated.

Then, the live data pruning unit 245 calculates the degree of association between an i-th live data item and the content ID from the character information of the i-th live data item and the content information acquired in Step S2150 (Step S2160). The degree of association is calculated as follows. The character string in the content information is compared with the character string in the character information of the i-th live data item. When there is the same character string, the degree of association with the content ID is added by a value corresponding to the length of the character string. For example, when the character information of the i-th live data item indicates "今、ハイパーニュースを見ています (Now, I am watching HyperNews)", "ハイパーニュース (HyperNews)", which is the title of the content with the content ID "content ID1" is included as a partial character string in the example shown in FIG. 34. In this case, since the length of the character string "ハイパーニュース (HyperNews)" is 8 Japanese characters, the degree of association of the i-th live data item with content ID1 is increased by 8.

When the character information of the live data indicates "日本太郎カッコいい (Nippon Taro is cool)", "日本太郎 (Nippon Taro)" who is the performer corresponding to content ID1 is included as a partial character string in the example shown in FIG. 34. Since the length of the character string "日本太郎 (Nippon Taro)" is 4 Japanese characters, the degree of association of the i-th live data item with content ID1 is increased by 4.

This character string comparison process is performed for each kind of content information corresponding to the content ID to calculate the degree of association between the i-th live data item and the broadcasting station ID.

Then, the live data pruning unit 245 determines whether the degree of association calculated in Step S2160 is equal to or more than a threshold value (Step S2170). When the degree of association is equal to or more than the threshold value, the process proceeds to Step S2190. When the degree of association is less than the threshold value, the process proceeds to Step S2180. The threshold value is set in advance by the designer.

When it is determined in Step S2170 that the degree of association is less than the threshold value, the live data pruning unit 245 deletes the i-th live data item such that the chapter candidate selecting unit 250 performing the next process does not allow the user to select the live data (Step S2180).

The next step S2190 is a terminal symbol of the loop A. When the loop symbol i is not the number of live data items N, the process returns to Step S2140.

The above is the flow of the process by the live data pruning unit 245. When the degree of association is calculated, a weight may be set to each kind of content information. For example, when there is a character string which coincides with the title, the length of the identical character string is multiplied by 1.2. When there is a character string which coincides with the performer, the length of the identical character string is multiplied by 1.5.

When a coincidental character string is less than a predetermined length, the threshold value may be set such that the degree of association is not increased.

In addition, by performing morphological analysis on the character information of the live data, only nouns may be compared. A synonym dictionary or an association word dictionary may be used and the degree of association may increase when there is a synonym or an association word. For example, in a case in which content with the content ID "content ID2" is selected, when a character string "buying" is included in the character information of the live data and "shopping" is acquired by the synonym dictionary, the degree of association between the live data and content ID2 increases since the character string coincides with a partial character string "shopping" in the title "shopping information" with the content ID "content ID2" in the example shown in FIG. 34.

The process by the live data pruning unit 245 is not limited to the above-mentioned process, but other methods may be used as long as the live data can be associated with the content information.

The above is the description of the chapter creating device 22.

According to the chapter creating device 22, since the live data which is not related to the digital content is not displayed, it becomes easy to select live data.

The content information storage unit 223 of the chapter creating device 22 may be arranged in an external server and return content information in response to a request.

Fifth Embodiment

Figure 36:
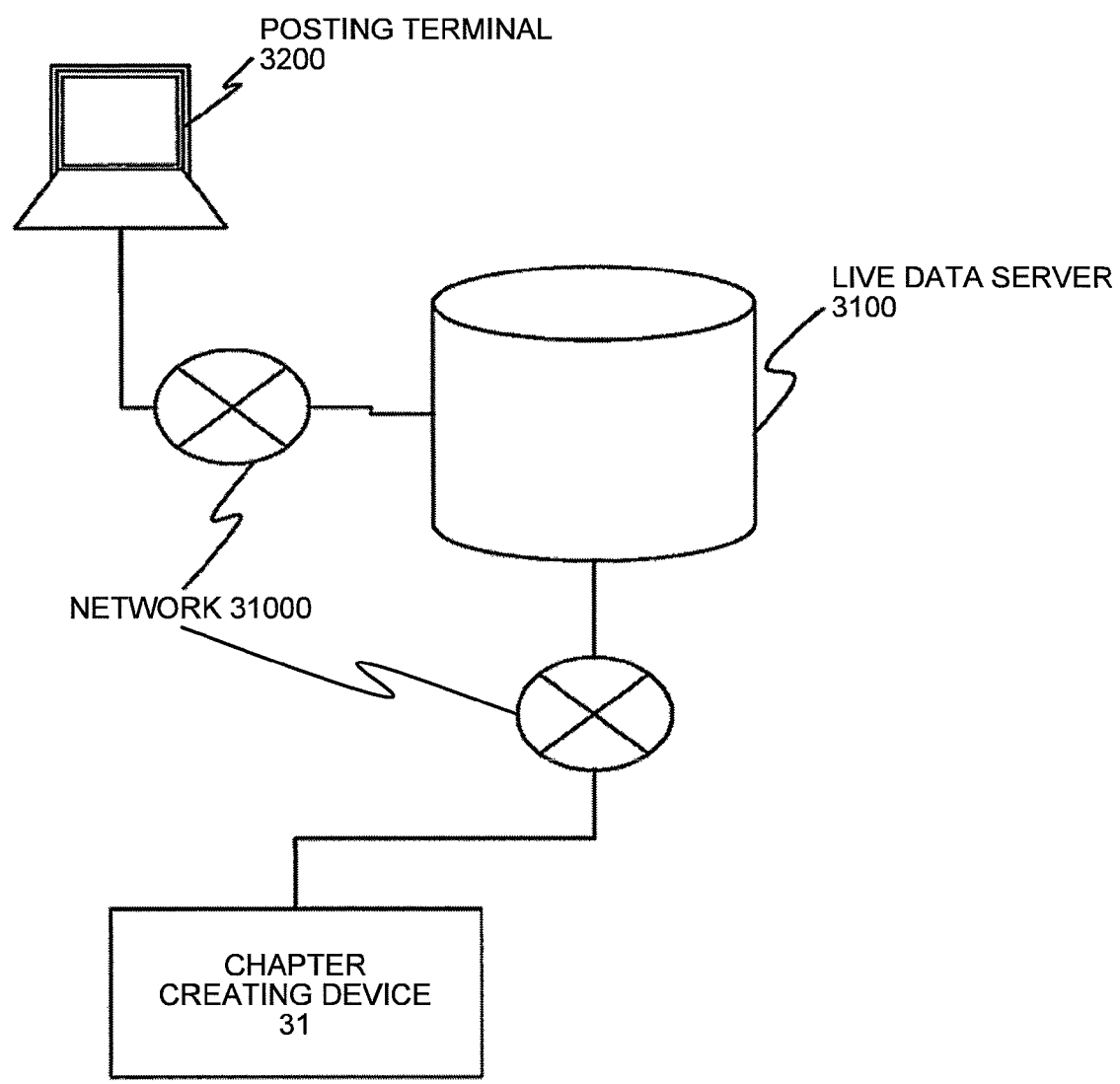
FIG. 36 is a system configuration diagram illustrating a fifth embodiment of the present invention.

FIG. 36 is a diagram illustrating the entire system of a fifth embodiment of the present invention in which a chapter creating device 31 and a live data server 3100 are connected to each other via a network 31000 and the live data server 3100 is connected to a posting terminal 3200 via the network 31000.

The live data server 3100 is a server for accumulating data transmitted from the user who uses a service and for opening the data to other users. The data is represented by what is called an SNS (Social Networking Service), BBS (Bulletin Board System), or a blog (including a miniblog) and opens the data to other users. The data accumulated in the live data server includes character information indicating the feeling of the user at the time when the data is being created. The live data server 3100 according to the fifth embodiment stores the character information transmitted by the posting terminal 3200 so as to be combined with the date and time when the character information is received. In addition, a plurality of live data servers 3100 may be provided.

Figure 37:
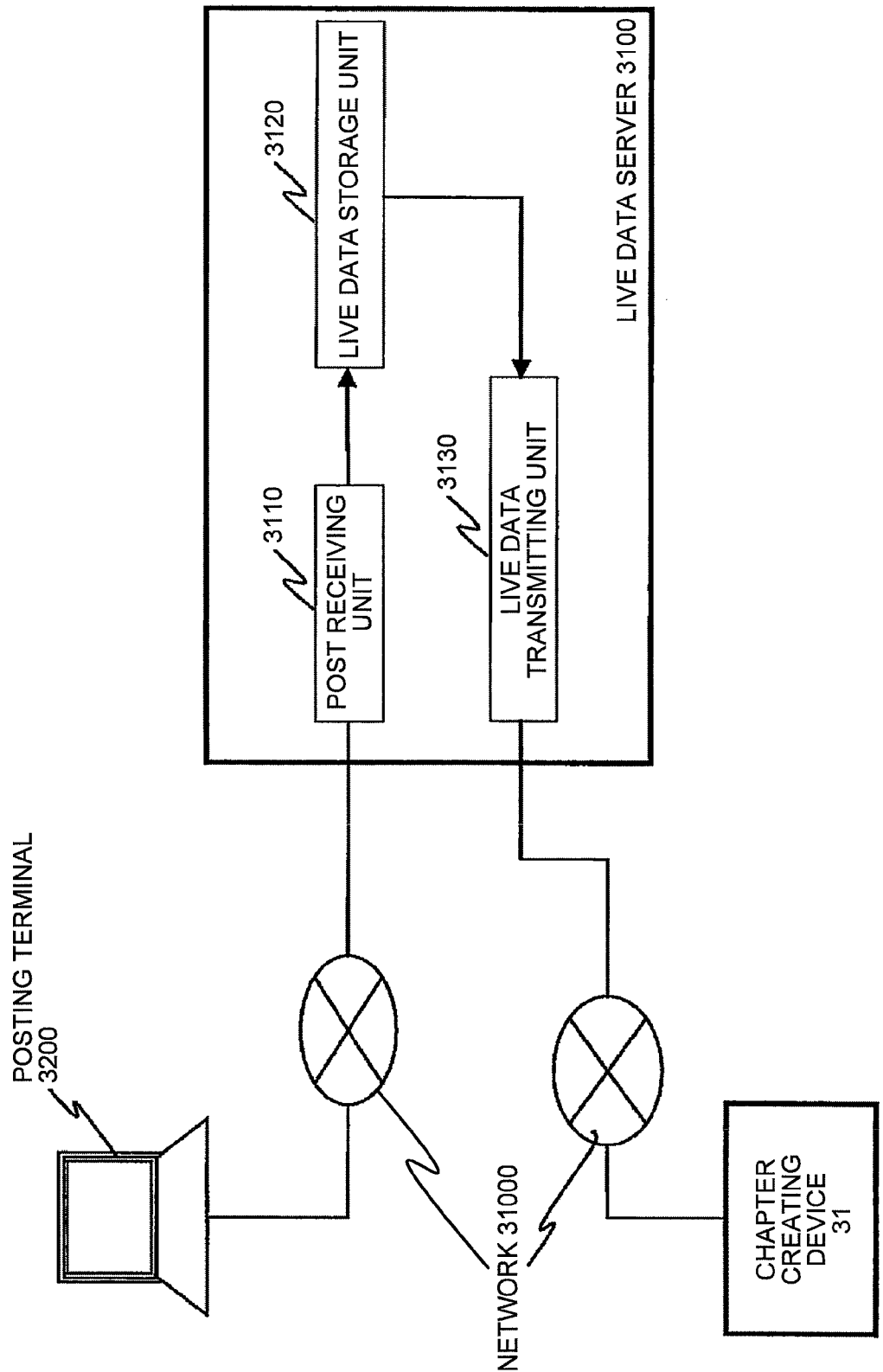
FIG. 37 is a block diagram illustrating the structure of a live data server according to the fifth embodiment of the present invention.

FIG. 37 is a block diagram illustrating the structure of the live data server 3100. The live data server 3100 includes a post receiving unit 3110, a live data storage unit 3120, and a live data transmitting unit 3130.

The post receiving unit 3110 receives the character information transmitted from an external posting terminal 3200 via the network 31000 and stores the character information together with the posting date and time, which is the date and time when the character information is received, in the live data storage unit 3120. Hereinafter, data obtained by combining the character information with the posting date and time of the character information is referred to as live data.

The live data storage unit 3120 is a database which stores the live data.

The live data transmitting unit 3130 transmits the live data stored in the live data storage unit 3120 via the network 31000. In addition, when the chapter creating device 31 designates the search conditions of the live data, such as the range of the posting date and time or a character string included in the character information, the live data transmitting unit 3130 transmits only the live data that satisfies the search conditions to the chapter creating device 31.

The above is the description of the live data server 3100. The number of live data servers 3100 is not limited to one, but a plurality of live data servers 3100 may be provided.

The posting terminal 3200 includes an input interface and a display for editing the character information for a general PC or a portable information terminal and has a communication means for transmitting the character information to the live data server 3100. A plurality of posting terminals 3200 may be provided. The number of users of the posting terminals 3200 may be one or more.

Next, the chapter creating device 31 will be described.

Figure 38:
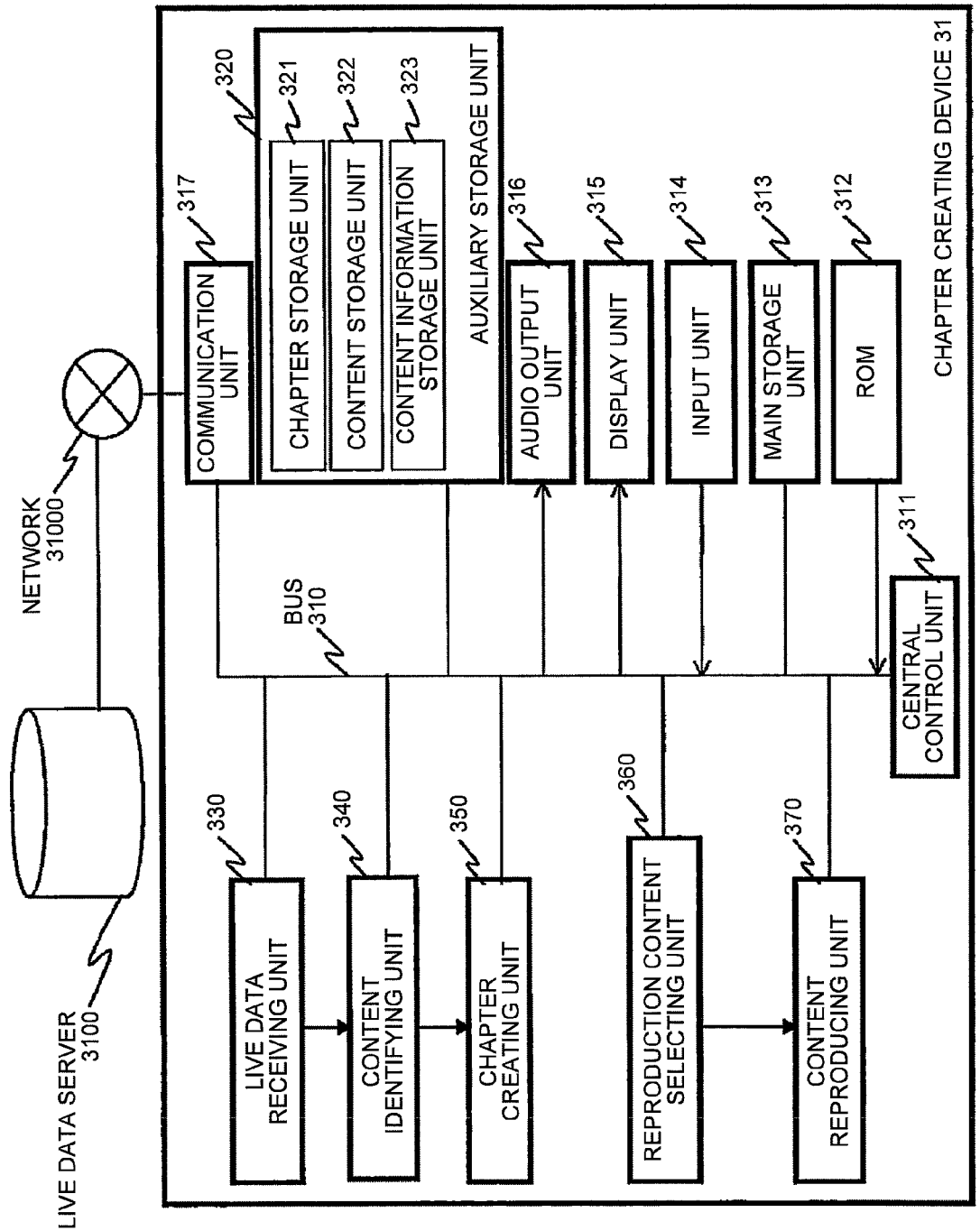
FIG. 38 is a block diagram illustrating the structure of a chapter creating device according to the fifth embodiment of the present invention.

FIG. 38 is a block diagram illustrating the preferred structure of the chapter creating device 31 according to the fifth embodiment. The chapter creating device 31 includes a central control unit 311, ROM 312, a main storage unit 313, an input unit 314, a display unit 315, an audio output unit 316, a communication unit 317, an auxiliary storage unit 320, a live data receiving unit 330, a content identifying unit 340, a chapter creating unit 350, a reproduction content selecting unit 360, and a content reproducing unit 370 which are connected to each other through a bus 310. The communication unit 317 is connected to the live data server 3100, which is an external device, by the network 31000.

In FIG. 38, the chapter creating device 31 is shown as a hardware component using a functional block diagram. However, the entire chapter creating device 31 may be one software program and may be softwarily implemented on a PC including memory or a CPU.

Next, the flow of a chapter creating process by the chapter creating device 31 will be described with reference to the flowchart shown in FIG. 39.

First, the live data receiving unit 330 receives the live data from the live data server 3100 via the network 31000 (Step S310).

Then, the central control unit 311 starts a loop B until a loop counter n having an initial value 1 and an increment of 1 reaches the number of live data items N acquired in Step S310 (Step S320). Then, an n-th live data item among the live data items acquired in Step S310 is given to the next Step S330.

Then, the content identifying unit 340 associates digital content with the n-th live data item (Step S330).

Then, the chapter creating unit 350 creates a chapter from the n-th live data item (Step S340).

Then, the chapter creating unit 350 stores the created chapter in a chapter storage unit 321 (Step S350).

The symbol shown in Step S360 indicates the terminal of the loop B. When the loop counter n reaches the number of live data items N, the chapter creating device 31 ends the process. If not, the process returns to Step S320 and the chapter creating process is repeated.

The above is the flow of the chapter creating process by the chapter creating device 31.

Figure 40:
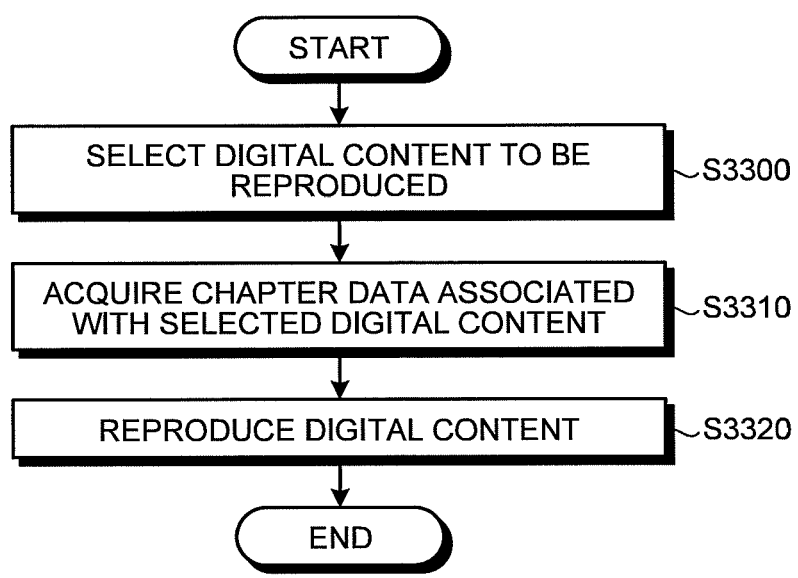
FIG. 40 is a flowchart illustrating the flow of the process of the chapter creating device according to the fifth embodiment of the present invention when performing reproduction using a chapter.

Next, the flow of the process of the chapter creating device 31 performing reproduction using the created chapter will be described with reference to the flowchart shown in FIG. 40.

First, the reproduction content selecting unit 360 displays a user interface screen on the display unit 315 and causes the user to select digital content to be reproduced via the input unit 314 (Step S3300).

Then, the content reproducing unit 370 acquires chapter data included in the range of the recording date and time of the digital content selected in Step S3300 from the chapter storage unit 321 (Step S3310).

Then, the content reproducing unit 370 starts the reproduction of the digital content selected in Step S3300, displays the chapter acquired in Step S3310 on the display unit 315, and presents the user interface capable of inputting the chapter via the input unit 314 (Step S3320).

The above is the flow of the process of the chapter creating device 31 performing reproduction using the chapter.

Next, each unit of the chapter creating device 31 will be described in detail. The central control unit 311 controls the overall operation of the chapter creating device 31 and includes a CPU (Central Processing Unit), a PLD (Programmable Logic Device), and the like. The ROM 312 is read only memory and stores a basic control program for controlling the overall operation of the chapter creating device 31. The main storage unit 313 is a work area which is used by the central control unit 311 to execute a program and is, for example, RAM. The input unit 314 is, for example, a keyboard, a mouse, or a touch panel and receives an input from the user. The display unit 315 is, for example, a CRT or a liquid crystal display and displays information to the user. The audio output unit 316 converts a digital audio signal into an analog signal, amplifies the analog signal, and outputs the amplified signal to, for example, an external speaker or a headphone. The communication unit 317 is, for example, a network card and communicates with an external network.

The auxiliary storage unit 320 is a high-capacity storage medium, such as an HDD (Hard Disk Drive) or an SSD (Solid State Drive), and further includes therein a chapter storage unit 321 and a content storage unit 322.

The chapter storage unit 321 stores chapter data, which is a combination of a chapter date and time indicating the date and time when a chapter is created, a header character string, and a content ID. The content ID is an identifier for uniquely identifying digital content. Basically, for the chapter date and time, date and time data based on UTC (Universal Time Coordinated) is stored. However, the chapter date and time is not limited to the date and time data based on UTC, but any date and time data may be stored as long as it can be converted into UTC. For example, data indicating JST (Japan Standard Time) may be used, or numerical data indicating Unix (registered trademark) time, which is relative time from Jan. 1, 1970 00:00:00 UTC, may be used.

FIG. 41 is a diagram illustrating an example of the format of the chapter storage unit 321, in which the chapter date and time, which is chapter data, the content ID, and the header character string are stored. In FIG. 41, a chapter ID, which is an identifier for identifying each chapter data item, is stored so as to be associated with each chapter data item. For example, the chapter date and time of chapter data with a chapter ID "chapter 1" is "2010-11-10 15:10:00", the content ID is "content ID1", and the header character string is "I cannot stand the impudence of the cat". The chapter data items with the chapter IDs "chapter ID1" and "chapter ID2" have the same content ID "content ID1", which indicates that the chapter data items with the chapter IDs "chapter ID1" and "chapter ID2" are associated with content with the content ID "content ID1".

The content storage unit 322 stores a combination of reproducible digital content, such as screen image data or audio data, an association start date and time, which is the start date and time of association with the digital content, and the length of the reproduction time of the digital content. For the association start date and time, when the digital content is broadcast content, the date and time when the content starts to be broadcasted is stored and, when the digital content is personal screen image content, the date and time when the content starts to be recorded is stored.

FIG. 42 is a diagram illustrating an example of the format of the content storage unit 322, in which a combination of the content ID, which is an identifier for identifying digital content, the association start date and time, and a reproduction time length, which is the length of the content reproduction time, is stored. For example, the association start date and time of digital content with the content ID "content ID1" is "2010-11-11 15:00:00" and the reproduction time length is "00:35:00", that is, 35 minutes.

A content information storage unit 323 stores a combination of the content ID and content information, which is sub-information about content. The content information is data that indicates content, such as a title, a genre, a performer, a caption, and a broadcasting station bibliographically.

FIG. 43 is a diagram illustrating an example of the format of the content information storage unit 323, in which the content ID and the content information are stored and a combination of the title and the performer is stored as the content information. For example, the title of content with the content ID "content ID1" is "HyperNews" and the performer is "Nippon Taro".

The live data receiving unit 330 receives live data from the live data server 3100 which is connected via the network 31000 by the communication unit 317. The search conditions of the live data server 3100 are designated such that the acquired live data included in the range from the previous communication date and time with the live data server 3100 to the current time is transmitted. Specifically, when the previous communication date and time is 2010-11-10 20:00:00 and the current time is 2010-11-11 1:30:00, the search conditions are designated such that the live data included in the range from 2010-11-10 20:00:00 to 2010-11-11 1:30:00 is transmitted and the live data server 3100 is requested to transmit the live data.

However, when communication between the live data receiving unit 330 and the live data server 3100 is performed for the first time, there is no previous communication date and time. In this case, basically, the search conditions are set such that live data in the range from the earliest association date and time to the current time is acquired among the live data items stored in the content storage unit 322. However, simply, the search conditions may be designated such that live data from more than 24 hours ago to the current time is acquired.

When a plurality of live data servers 3100 is present, the designer of the chapter creating device 31 basically sets one of the live data servers 3100 from which live data will be received in advance. However, the live data may be received from all of the live data servers 3100.

Figure 44:
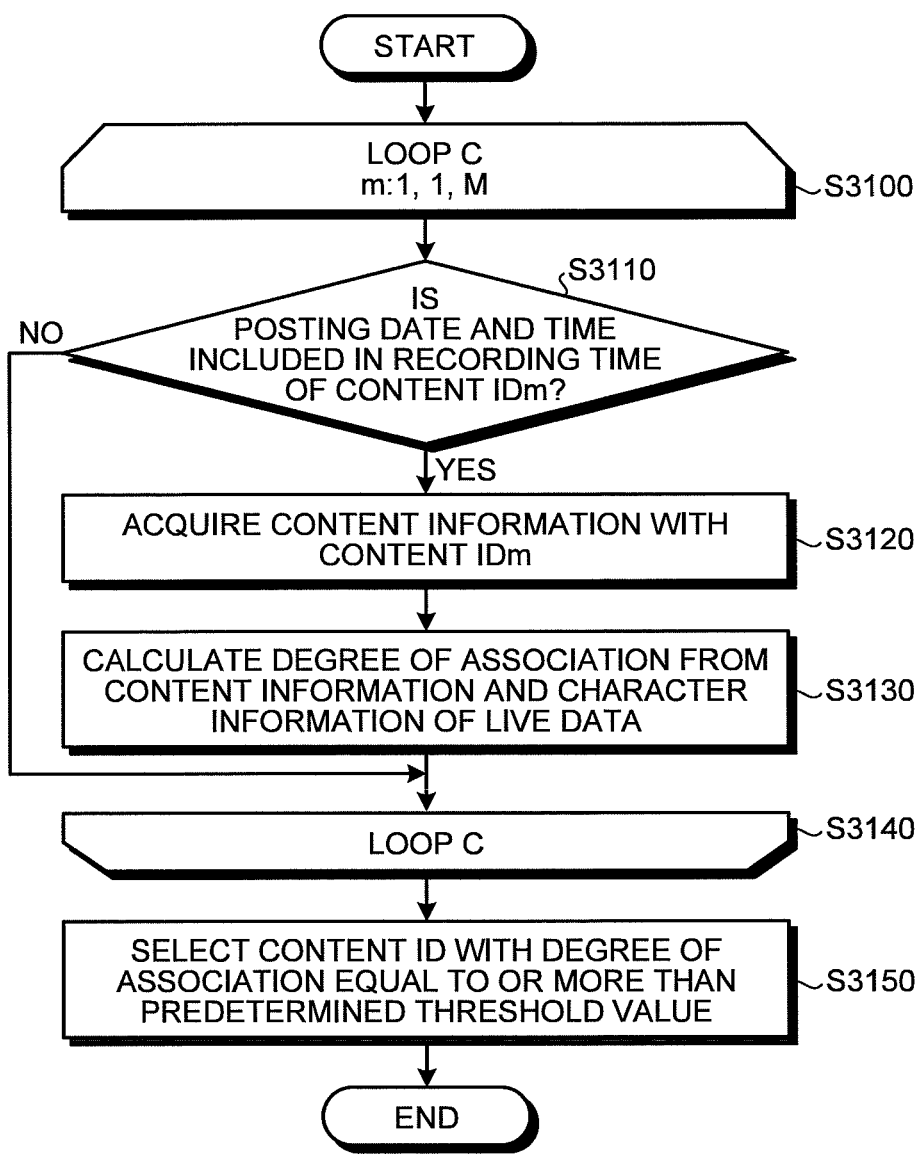
FIG. 44 is a flowchart illustrating the flow of the process of a content identifying unit according to the fifth embodiment of the present invention.

The content identifying unit 340 calculates the degree of association of each content ID with the live data from the live data received by the live data receiving unit 330 and the content information for each content ID stored in the content information storage unit 323 and associates the live data with the content ID with the degree of association equal to or more than a threshold value. The flow of the process of the content identifying unit 340 will be described with reference to the flowchart illustrated in FIG. 44.

First, the content identifying unit 340 starts a loop process (Step S3100). The symbol of Step S3100 indicates a loop and a loop C in which a loop counter m has an initial value 1, an increment of 1, and an end value M is performed. The end value M is a count value stored in the content storage unit 322.

Then, the content identifying unit 340 acquires the association start date and time and the reproduction time length of an m-th content ID (hereinafter, referred to as content IDm) in the content storage unit 322 and determines whether the posting date and time of live data is included in the time width on the basis of the association start date and time to the date and time obtained by adding the reproduction time length to the association start date and time (Step S3110). For example, in the example of the content storage unit 322 shown in FIG. 42, when the content IDm is content ID1, the association start date and time is 2010-11-11 15:00:00 and the date and time obtained by adding the reproduction time length to the association start date and time is 2010-11-11 15:35:00. It is determined whether the posting date and time of live data is included in the period from 2010-11-11 15:00:00 to 2010-11-11 15:35:00. When the posting date and time is included in the period, the process proceeds to Step S3120. When the posting date and time is not included in the period, the process proceeds to Step S3140.

When it is determined in Step S3110 that the live data is included in the time of the content IDm, the content identifying unit 340 acquires content information corresponding to the content IDm from the content information storage unit 323 (Step S3120).

Then, the content identifying unit 340 calculates the degree of association with the content IDm from the acquired content information and the character information of the live data (Step S3130). The degree of association is calculated as follows. A character string in the content information is compared with a character string in the character information of the live data. When there is an identical character string, the degree of association with the content ID is added by a value corresponding to the length of the character string.

For example, when the character information of live data indicates "、今、ハイパーニュースを見ています (Now, I am watching HyperNews)" and the content IDm is "content ID1"," ハイパーニュース (HyperNews)", which is the title corresponding to content ID1 is included as a partial character string in the example shown in FIG. 43. In this case, since the length of the character string " ハイパーニュース (HyperNews)" is 8 Japanese characters, the degree of association with content ID1 is increased by 8. When the character information of live data indicates "今、ハイパーニュースを見ています 日本太郎カッコいい (NOW, I am watching HyperNews. Nippon Taro is cool)", as described above, the degree of association with content ID1 is increased by 8 by a partial character string "ハイパーニュース (HyperNews)". In addition, since "日本太郎 (Nippon Taro)" who is the performer corresponding to content ID1 is also included as a partial character string, the length of the character string "日本太郎 (Nippon Taro)", that is, 4 Japanese characters are added to the degree of association.

This character string comparison process is performed for each kind of content information corresponding to the content IDm to calculate the degree of association between the live data and the content IDm.

The symbol of the next Step S3140 indicates the terminal of a loop identifier loop C. When the loop C satisfies conditions, that is, when the loop counter m reaches the end value M, the process proceeds to Step S3150. If not, the process returns to Step S3100 (Step S3140).

When the loop ends, the content identifying unit 340 selects all content IDs with the degree of association equal to or more than a predetermined threshold value (Step S3150). The selected content IDs and the live data are transmitted to the chapter creating unit 350.

The above is the flow of the process by the content identifying unit 340. When the degree of association is calculated, a weight may be set to each kind of content information. For example, when there is a character string which coincides with the title, the length of the identical character string is multiplied by 1.2. When there is a character string which coincides with the performer, the length of the identical character string is multiplied by 1.5.

When the identical partial character string does not satisfy a predetermined length, the threshold value may be set such that the degree of association is not increased.

In addition, by performing morphological analysis on the character information of the live data, only nouns may be compared.

A synonym dictionary or an association word dictionary may be used and the degree of association may increase when there is a synonym or an association word. For example, in a case in which the content IDm is "content ID2", when a character string "buying" is included in the character information of the live data and "shopping" is acquired by the synonym dictionary, the degree of association between the live data and content ID2 increases since the character string is identical to a partial character string "shopping" in the title "shopping information" corresponding to content ID2 in the example shown in FIG. 43.

The process by the content identifying unit 340 is not limited to the above-mentioned process, but other methods may be used as long as they can associate the live data with the content ID.

Returning to FIG. 38, the chapter creating unit 350 creates a chapter from the live data and stores the chapter in the chapter storage unit 321. Specifically, the chapter creating unit 350 combines the posting date and time of the live data as the chapter date and time, the character information of the live data as the chapter header, and the content ID associated by the content identifying unit 340 to create chapter data. At this time, a unique chapter ID other than the chapter IDs stored in the chapter storage unit 321 is allocated to the created chapter data. When the creation of the chapter data ends, the chapter creating unit 350 stores the created chapter data in the chapter storage unit 321.

When the chapter data is being created, the chapter creating unit 350 may edit the chapter data such that the length of characters in the chapter header is equal to or less than a predetermined value, for example, 20 characters.

Figure 39:
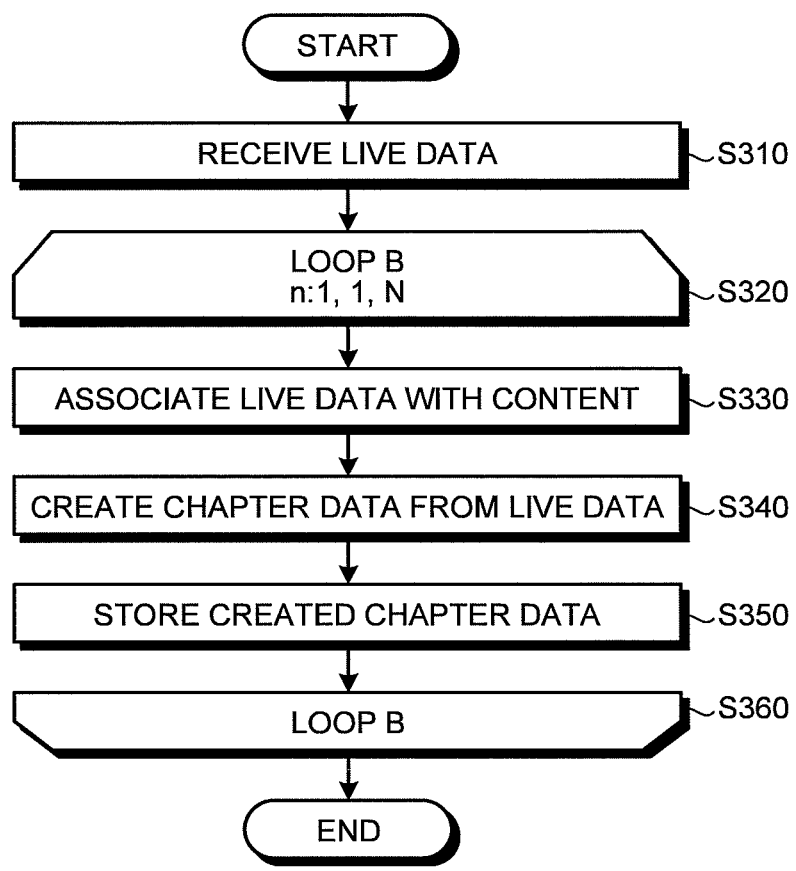
FIG. 39 is a flowchart illustrating the flow of the process of a chapter creating device according to the fifth embodiment of the present invention.

The live data receiving unit 330, the content identifying unit 340, and the chapter creating unit 350 correspond to the unit that performs the chapter creating process shown in FIG. 39. Subsequently, the reproduction content selecting unit 360 and the content reproducing unit 370 which are units for performing a chapter reproducing process will be described with reference to the flowchart shown in FIG. 40.

Figure 45:
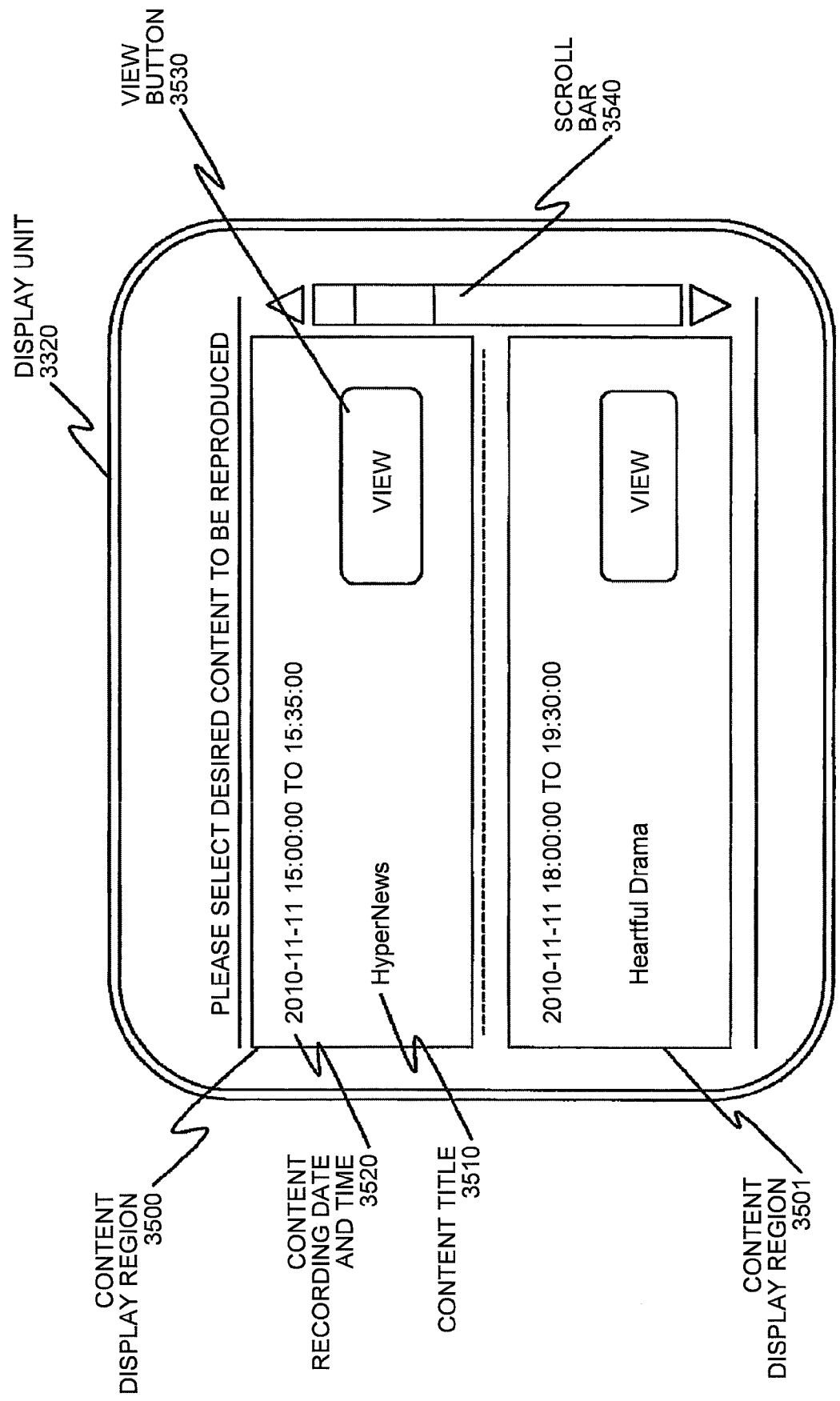
FIG. 45 is a diagram illustrating an example of a user interface presented by a reproduction content selecting unit according to the fifth embodiment of the present invention.

The reproduction content selecting unit 360 causes the user to select digital content to be reproduced via the input unit 314. In order to help the user input information, the reproduction content selecting unit 360 displays the user interface screen on the display unit 315 so as to cause the user to select the digital content to be reproduced. FIG. 45 is a diagram illustrating an example of the user interface screen presented by the reproduction content selecting unit 360.

In FIG. 45, information with a content ID "content ID1" shown in FIGS. 42 and 43 is displayed in a content display region 3500 and information with a content ID "content ID2" shown in FIGS. 42 and 43 is displayed in a content display region 3501, respectively.

Since the content display region 3500 and the content display region 3501 are configured by the similar components, only the content display region 3500 will be described here. A content title 3510 in the content display region 3500 is a region in which the title of digital content is displayed and the title "HyperNews" with the content ID "content ID1" is displayed in the content title 3510. A content recording date and time 3520 in the content display region 3500 is a region in which the period from the date and time when the recording of content starts to the date and time when the recording of content ends is displayed, and "2010-11-11 15:00:00 to 15:35:00" is displayed in the content recording date and time 3520. A view button 3530 is pressed down by the user when the user starts to view the content.

When a scroll bar 3540 is scrolled, the information in the content display region 3500 and the content display region 3501 is changed depending on the amount of scroll. The user operates the scroll bar 3540 to search for digital content and presses the view button corresponding to digital content which is desired to be viewed, thereby starting to view the digital content.

The content reproducing unit 370 starts the reproduction of the digital content selected by the reproduction content selecting unit 360. In other words, the content reproducing unit 370 outputs the screen image of the digital content to the display unit 315, and outputs an audio thereof to the audio output unit 316. In addition, the content reproducing unit 370 displays the chapters associated with the selected digital content on the display unit 315 and presents the user interface which enables the user to select the chapters. The chapter data is acquired as follows. All of the chapter data items associated with the same content ID are acquired on the basis of the content ID of the digital content selected by the reproduction content selecting unit 360 with reference to the chapter storage unit 321.

When the user selects a chapter, the content reproducing unit 370 moves the reproduction position of the digital content to a position where the selected chapter is seen. When the chapter date and time of the selected chapter is c and the association start date and time of the digital content is d, the reproduction position p of the digital content is calculated by the following Expression 3.

$$p = c - d \quad (3)$$

The reproduction position p calculated by Expression 3 is the time when the head of the digital content is 0.

FIG. 46 shows an example of the display of the user interface and the screen image data of content which are displayed on the display unit 315 by the content reproducing unit 370. In FIG. 46, a screen image display region 3600 is a region in which screen image of digital content to be reproduced is displayed. A seek bar 3610 is a controller which indicates information about the reproduction position of the digital content and enables the user to control the reproduction position. A chapter list 3620 represents chapters related to the digital content which is being reproduced. In FIG. 46, two chapters "I cannot stand the impudence of the cat" and "Isn't the hamburger here very delicious?" are displayed. When the user presses a chapter button 3630A or a chapter button 3630B, the reproduction position is moved to the position of the chapter associated with the button. For example, when the chapter button 3630A is pressed down, the reproduction position is moved to a position which is "00:10:00" compared from the head of the digital content, that is, a position which is 10 minutes compared from the head of the digital content. When the chapter button 3630B is pressed down, the reproduction position is moved to a position which is "00:30:00" compared from the head of the digital content, that is, 30 minutes compared from the head of the digital content.

As shown in FIG. 46, even when the user does not perform a character input operation, information indicating "I cannot stand the impudence of the cat" or "Isn't the hamburger here very delicious?" is displayed as the header of the chapter. In addition, it is guessed that an impudent cat appears before and after the chapter from the character information indicating "I cannot stand the impudence of the cat", and it is guessed that there is a dialogue about a delicious hamburger before and after the chapter from the character information indicating "Isn't the hamburger here very delicious?".

The above is the description of the chapter creating device 31. According to the above-mentioned chapter creating device 31, it is possible to create a chapter corresponding to content, without performing a complicated operation, such as the input of characters, and set a chapter header indicating the outline of the chapter.

In the fifth embodiment, the content ID is stored in the chapter storage unit 321, thereby associating the chapter data with the digital content. However, the chapter ID may be stored in the content storage unit 322, thereby associating the chapter data with the digital content. In this case, the chapter creating unit 350 stores the chapter ID of the created chapter data in the content ID column of the corresponding content storage unit 322.

The content information storage unit 323 may be provided in an external server and may be configured to return content information in response to a request.

In the first to fifth embodiments, digital content is given as an example of the content. However, the content may be analog content. In addition, television broadcast content is given as an example of the broadcast content. However, the broadcast content may be radio broadcast content.

According to the present invention, a sentence which is created by the user and is stored in a live data storage unit and the date and time when the sentence is created are incorporated with each other. In this way, the user can give the header of a chapter without a complicated operation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A chapter creating device that creates chapter data which indicates a starting point of content including at least one of audio or video, and includes time information indicating a reproduction start position and a header indicating an outline of the content at a reproduction point, the chapter creating device comprising:
   a live data receiving unit that receives live data including character string data which is input to a terminal by a viewer of the content which is transmitted from the terminal and a data registration date and time which is a date and time when the character string data is transmitted;
   a chapter candidate selecting unit that displays a list of live data entries received by the live data receiving unit on a display unit so as to prompt a user to select the displayed live data using an input unit, wherein each live data entry comprises:
      a broadcasting station name and a control for selecting the entry, a screen title to prompt the user to select a live data entry, and a control that invokes importing functionality;
   a chapter creating unit that creates chapter data including the character string data of the selected live data as the header and the data registration date and time of the selected live data as the time information, wherein
   the chapter data created by the chapter creating unit is configured to separate a broadcast content, and includes time information indicating a separation position, a header indicating the outline of the content at the time specified by the time information, and a broadcasting station ID identifying a broadcasting station which broadcasts the broadcast content, wherein
   the chapter creating device further includes:
   a broadcast content information storage unit that combines and stores the broadcasting time of the broadcast content which is broadcasted by the broadcasting station and broadcast content information which is sub-information about the broadcast content; and
   a broadcasting station identifying unit that allocates the broadcasting station ID to the live data based on highest degree of association between the character string data of the live data and each of the broadcast content information associated with a first broadcast content, the first broadcast content being a plurality of broadcast contents in which the data registration date and time of the live data is included in the broadcasting time, and wherein
   the chapter creating unit creates the chapter data using the character string data of the live data selected by the chapter candidate selecting unit as the header, the data registration date and time of the selected live data as the time information, and the broadcasting station ID allocated to the selected live data; and
   a content reproducing unit that displays a list of the created chapters, wherein the entry for each chapter comprises:
      a chapter length,
      chapter title selected by the user,
      a control for editing the chapter title and a control for playing the chapter, and
      a screen title to inform the user to select a chapter to play, wherein the list can be displayed in a separate pane on the screen with a content player, or on a full-screen display by itself, wherein the user selects an entry from the list as the selected chapter to be reproduced on the screen.

2. A method that creates chapter data which indicates a starting point of content including at least one of audio or video, and includes time information indicating a reproduction start position and a header indicating an outline of the content at a reproduction point, the chapter creating method comprising:
  receiving, by a central processing unit (CPU) or a programmable logic device, live data including character string data which is input to a terminal by a viewer of the content which is transmitted from the terminal and a data registration date and time which is a date and time when the character string data is transmitted;
  displaying, by the CPU or the programmable logic device, a list of received live data entries on a display unit so as to prompt a user to select the displayed live data using an input unit, wherein each live data entry comprises:
    a broadcasting station name and a control for selecting the entry, a screen title to prompt the user to select a live data entry, and a control that invokes importing functionality;
  creating, by the CPU or the programmable logic device, chapter data including the character string data of the selected live data as the header and the data registration date and time of the selected live data as the time information, wherein the created chapter data is configured to separate a broadcast content, and includes time information indicating a separation position, a header indicating the outline of the content at the time specified by the time information, and a broadcasting station ID identifying a broadcasting station which broadcasts the broadcast content;
  combining and storing, by the CPU or the programmable logic device, the broadcasting time of the broadcast content which is broadcasted by the broadcasting station and broadcast content information which is sub-information about the broadcast content;
  allocating, by the CPU or the programmable logic device, the broadcasting station ID to the live data based on highest degree of association between the character string data of the live data and each of the broadcast content information associated with a first broadcast content, the first broadcast content being a plurality of broadcast contents in which the data registration date and time of the live data is included in the broadcasting time; and
  creating, by the CPU or the programmable logic device, the chapter data using the character string data of the selected live data as the header, the data registration date and time of the selected live data as the time information, and the broadcasting station ID allocated to the selected live data; and
  displaying, by the CPU or the programmable logic device, a list of the created chapters, wherein the entry for each chapter comprises:
    a chapter length,
    chapter title selected by the user,
    a control for editing the chapter title and a control for playing the chapter, and
    a screen title to inform the user to select a chapter to play, wherein the list can be displayed in a separate pane on the screen with a content player, or on a full-screen display by itself, wherein the user selects an entry from the list as the selected chapter to be reproduced on the screen.

3. A computer program product that has a non-transitory computer-readable medium including programmed instructions for creating chapter data which indicates a starting point of content including at least one of audio or video, and includes time information indicating a reproduction start position and a header indicating an outline of the content at a reproduction point, when executed by a computer, the instructions cause the computer to:
  receive live data including character string data which is input to a terminal by a viewer of the content which is transmitted from the terminal and a data registration date and time which is a date and time when the character string data is transmitted;
  display a list of received live data entries on a display unit so as to prompt a user to select the displayed live data using an input unit, wherein each live data entry comprises:
    a broadcasting station name and a control for selecting the entry, a screen title to prompt the user to select a live data entry, and a control that invokes importing functionality;
  create chapter data including the character string data of the selected live data as the header and the data registration date and time of the selected live data as the time information, wherein the created chapter data is configured to separate a broadcast content, and includes time information indicating a separation position, a header indicating the outline of the content at the time specified by the time information, and a broadcasting station ID identifying a broadcasting station which broadcasts the broadcast content;
  combine and store the broadcasting time of the broadcast content which is broadcasted by the broadcasting station and broadcast content information which is sub-information about the broadcast content;
  allocate the broadcasting station ID to the live data based on highest degree of association between the character string data of the live data and each of the broadcast content information associated with a first broadcast content, the first broadcast content being a plurality of broadcast contents in which the data registration date and time of the live data is included in the broadcasting time; and
  create the chapter data using the character string data of the selected live data as the header, the data registration date and time of the selected live data as the time information, and the broadcasting station ID allocated to the selected live data; and
  display a list of the created chapters, wherein the entry for each chapter comprises:
    a chapter length,
    chapter title selected by the user,
    a control for editing the chapter title and a control for playing the chapter, and
    a screen title to inform the user to select a chapter to play, wherein the list can be displayed in a separate pane on the screen with a content player, or on a full-screen display by itself, wherein the user selects an entry from the list as the selected chapter to be reproduced on the screen.

* * * * *